(12) United States Patent
Pettovello

(10) Patent No.: US 9,171,100 B2
(45) Date of Patent: Oct. 27, 2015

(54) MTREE AN XPATH MULTI-AXIS STRUCTURE THREADED INDEX

(76) Inventor: Primo M. Pettovello, Canton, MI (US)

( * ) Notice: Subject to any disclaimer, the term of this patent is extended or adjusted under 35 U.S.C. 154(b) by 1270 days.

(21) Appl. No.: 11/233,869

(22) Filed: Sep. 22, 2005

(65) Prior Publication Data

US 2006/0064432 A1 Mar. 23, 2006

Related U.S. Application Data

(60) Provisional application No. 60/612,025, filed on Sep. 22, 2004, provisional application No. 60/641,227, filed on Jan. 4, 2005, provisional application No. 60/661,716, filed on Mar. 15, 2005, provisional application No. 60/698,629, filed on Jul. 13, 2005.

(51) Int. Cl.
*G06F 17/30* (2006.01)

(52) U.S. Cl.
CPC ................................ *G06F 17/30911* (2013.01)

(58) Field of Classification Search
CPC .................................................. G06F 17/30911
USPC .............................................. 707/103 X, 791
See application file for complete search history.

(56) References Cited

U.S. PATENT DOCUMENTS

| | | | |
|---|---|---|---|
| 5,488,717 A | 1/1996 | Gibson et al. | |
| 5,657,241 A | 8/1997 | Butts et al. | |
| 5,671,416 A | 9/1997 | Elson | |
| 5,737,732 A | 4/1998 | Gibson et al. | |
| RE35,881 E | 8/1998 | Barrett et al. | |
| 5,893,102 A | 4/1999 | Maimone et al. | |
| 5,987,449 A | 11/1999 | Suciu | |
| 5,999,926 A | 12/1999 | Suciu | |
| 6,121,901 A | 9/2000 | Welch et al. | |
| 6,154,213 A | 11/2000 | Rennison et al. | |
| 6,256,642 B1 | 7/2001 | Krueger et al. | |
| 6,259,444 B1 | 7/2001 | Palmer et al. | |
| 6,415,279 B1 | 7/2002 | Gard et al. | |
| 6,505,205 B1 | 1/2003 | Kothuri et al. | |
| 6,675,160 B2 | 1/2004 | Hara et al. | |
| 6,772,165 B2 | 8/2004 | O'Carroll | |
| 6,804,677 B2 | 10/2004 | Shadmon et al. | |
| 6,871,204 B2 | 3/2005 | Krishnaprasad et al. | |
| 6,901,410 B2 | 5/2005 | Marron et al. | |
| 6,904,454 B2 | 6/2005 | Stickler | |

(Continued)

FOREIGN PATENT DOCUMENTS

EP 0 977 128 A1 2/2000

OTHER PUBLICATIONS

Cormen, Thomas H., "Introduction to Algorithms," MIT Press 1995, p. 215.

(Continued)

*Primary Examiner* — Syling Yen
(74) *Attorney, Agent, or Firm* — Brooks Kushman P.C.

(57) ABSTRACT

An index data structure ("MTree") useful in creating indices for structured data is provided. The MTree index data structure is designed to meet the needs of the hierarchical XPath query language. The primary feature of MTree is the next subtree root node in document order for all axes are available to each context node in O(1). The MTree index data structure supports modification operations such as insert and delete. The MTree index structure is implemented in memory or in a digital storage medium. Improved performance in the MTree index structure utilizing a threading scheme is also provided.

10 Claims, 25 Drawing Sheets

(56) References Cited

U.S. PATENT DOCUMENTS

| | | | |
|---|---|---|---|
| 7,062,507 B2 | 6/2006 | Wang et al. |
| 7,219,091 B1 | 5/2007 | Bruno et al. |
| 7,415,463 B2 | 8/2008 | Testa |
| 7,415,472 B2 | 8/2008 | Testa |
| 7,509,305 B2 | 3/2009 | Tozawa et al. |
| 2001/0039570 A1 | 11/2001 | Stewart et al. |
| 2002/0010741 A1 | 1/2002 | Stewart et al. |
| 2002/0013759 A1 | 1/2002 | Stewart et al. |
| 2002/0019797 A1 | 2/2002 | Stewart et al. |
| 2002/0054090 A1 | 5/2002 | Silva et al. |
| 2002/0078094 A1 | 6/2002 | Krishnaprasad et al. |
| 2002/0091539 A1 | 7/2002 | Yin et al. |
| 2002/0091579 A1 | 7/2002 | Yehia et al. |
| 2002/0091614 A1 | 7/2002 | Yehia et al. |
| 2002/0099687 A1 | 7/2002 | Krishnaprasad et al. |
| 2002/0107973 A1 | 8/2002 | Lennon et al. |
| 2002/0120685 A1 | 8/2002 | Srivastava et al. |
| 2002/0129000 A1 | 9/2002 | Pillai et al. |
| 2002/0133497 A1 | 9/2002 | Draper et al. |
| 2002/0138582 A1 | 9/2002 | Chandra et al. |
| 2002/0147726 A1 | 10/2002 | Yehia et al. |
| 2002/0152267 A1 | 10/2002 | Lennon |
| 2002/0156693 A1 | 10/2002 | Stewart et al. |
| 2002/0161688 A1 | 10/2002 | Stewart et al. |
| 2002/0161801 A1* | 10/2002 | Hind et al. ............ 707/513 |
| 2002/0170070 A1 | 11/2002 | Rising, III et al. |
| 2002/0174147 A1 | 11/2002 | Wang et al. |
| 2002/0198905 A1 | 12/2002 | Tabatabai et al. |
| 2003/0018607 A1 | 1/2003 | Lennon et al. |
| 2003/0018668 A1 | 1/2003 | Britton et al. |
| 2003/0028557 A1 | 2/2003 | Walker et al. |
| 2003/0041065 A1 | 2/2003 | Lucovsky et al. |
| 2003/0041076 A1 | 2/2003 | Lucovsky et al. |
| 2003/0046317 A1 | 3/2003 | Gseri et al. |
| 2003/0050911 A1 | 3/2003 | Lucovsky et al. |
| 2003/0061229 A1 | 3/2003 | Lusen et al. |
| 2003/0065874 A1* | 4/2003 | Marron et al. ............ 711/100 |
| 2003/0069881 A1 | 4/2003 | Huttunen |
| 2003/0069887 A1 | 4/2003 | Lucovsky et al. |
| 2003/0070158 A1 | 4/2003 | Lucas et al. |
| 2003/0074352 A1 | 4/2003 | Raboczi et al. |
| 2003/0084180 A1 | 5/2003 | Azami |
| 2003/0088573 A1 | 5/2003 | Stickler |
| 2003/0088593 A1 | 5/2003 | Stickler |
| 2003/0093434 A1 | 5/2003 | Stickler |
| 2003/0093755 A1 | 5/2003 | O'Carroll |
| 2003/0097365 A1 | 5/2003 | Stickler |
| 2003/0097485 A1 | 5/2003 | Horvitz et al. |
| 2003/0101190 A1 | 5/2003 | Horvitz et al. |
| 2003/0105746 A1 | 6/2003 | Stickler |
| 2003/0110442 A1 | 6/2003 | Battle |
| 2003/0115228 A1 | 6/2003 | Horvitz et al. |
| 2003/0120978 A1 | 6/2003 | Fabbrizio et al. |
| 2003/0125929 A1 | 7/2003 | Bergstraesser et al. |
| 2003/0131069 A1 | 7/2003 | Lucovsky et al. |
| 2003/0131073 A1 | 7/2003 | Lucovsky et al. |
| 2003/0131142 A1 | 7/2003 | Horvitz et al. |
| 2003/0158836 A1 | 8/2003 | Venkatesh et al. |
| 2003/0171962 A1 | 9/2003 | Hirth et al. |
| 2003/0172007 A1 | 9/2003 | Helmolt et al. |
| 2003/0172196 A1 | 9/2003 | Hejlsberg et al. |
| 2003/0193994 A1 | 10/2003 | Stickler |
| 2003/0200502 A1 | 10/2003 | Abe et al. |
| 2003/0212657 A1 | 11/2003 | Kaluskar et al. |
| 2003/0212664 A1 | 11/2003 | Breining et al. |
| 2003/0225825 A1 | 12/2003 | Healey et al. |
| 2004/0002976 A1 | 1/2004 | Lucovsky |
| 2004/0006563 A1 | 1/2004 | Zwiegincew et al. |
| 2004/0006564 A1 | 1/2004 | Lucovsky et al. |
| 2004/0006590 A1 | 1/2004 | Lucovsky et al. |
| 2004/0010754 A1 | 1/2004 | Jones |
| 2004/0015783 A1 | 1/2004 | Lennon et al. |
| 2004/0024875 A1 | 2/2004 | Horvitz et al. |
| 2004/0028212 A1 | 2/2004 | Lok et al. |
| 2004/0034830 A1* | 2/2004 | Fuchs et al. ............ 715/501.1 |
| 2004/0039734 A1 | 2/2004 | Judd et al. |
| 2004/0044659 A1 | 3/2004 | Judd et al. |
| 2004/0044680 A1 | 3/2004 | Thorpe et al. |
| 2004/0044961 A1 | 3/2004 | Pesenson |
| 2004/0044965 A1 | 3/2004 | Toyama et al. |
| 2004/0044990 A1 | 3/2004 | Schloegel et al. |
| 2004/0046789 A1 | 3/2004 | Inanoria |
| 2004/0060002 A1 | 3/2004 | Lucovsky et al. |
| 2004/0060006 A1 | 3/2004 | Lindblad et al. |
| 2004/0060007 A1 | 3/2004 | Gottlob et al. |
| 2004/0064466 A1 | 4/2004 | Manikutty et al. |
| 2004/0073541 A1 | 4/2004 | Lindblad et al. |
| 2004/0088320 A1 | 5/2004 | Perry |
| 2004/0098384 A1* | 5/2004 | Min et al. ............ 707/3 |
| 2004/0098667 A1 | 5/2004 | Atkinson |
| 2004/0103091 A1 | 5/2004 | Lindblad et al. |
| 2004/0103105 A1 | 5/2004 | Lindblad et al. |
| 2004/0111396 A1 | 6/2004 | Musayev et al. |
| 2004/0117439 A1 | 6/2004 | Levett et al. |
| 2004/0122844 A1 | 6/2004 | Malloy et al. |
| 2004/0126094 A1 | 7/2004 | Kotani |
| 2004/0148213 A1 | 7/2004 | Aziz et al. |
| 2004/0148214 A1 | 7/2004 | Aziz et al. |
| 2004/0148299 A1 | 7/2004 | Teegan et al. |
| 2004/0148375 A1 | 7/2004 | Levett et al. |
| 2004/0153871 A1 | 8/2004 | Pietschker et al. |
| 2004/0163041 A1 | 8/2004 | Engel |
| 2004/0181511 A1 | 9/2004 | Xu et al. |
| 2004/0181543 A1 | 9/2004 | Wu et al. |
| 2004/0199861 A1 | 10/2004 | Lucovsky |
| 2004/0199869 A1 | 10/2004 | Lucovsky et al. |
| 2004/0205082 A1 | 10/2004 | Fontoura et al. |
| 2004/0205577 A1 | 10/2004 | Abe et al. |
| 2004/0205605 A1 | 10/2004 | Adler et al. |
| 2004/0210573 A1 | 10/2004 | Abe et al. |
| 2004/0210839 A1 | 10/2004 | Lucovsky |
| 2004/0215600 A1 | 10/2004 | Aridor et al. |
| 2004/0220895 A1 | 11/2004 | Carus et al. |
| 2004/0221229 A1* | 11/2004 | Perry ............ 715/514 |
| 2004/0230583 A1 | 11/2004 | Testa |
| 2004/0230602 A1 | 11/2004 | Doddington |
| 2004/0230674 A1 | 11/2004 | Pourheidari et al. |
| 2004/0230943 A1 | 11/2004 | Pourheidari et al. |
| 2004/0243931 A1 | 12/2004 | Stevens et al. |
| 2004/0249844 A1 | 12/2004 | Kotani |
| 2004/0260685 A1 | 12/2004 | Pfleiger et al. |
| 2004/0261019 A1 | 12/2004 | Imamura et al. |
| 2004/0267747 A1 | 12/2004 | Choi et al. |
| 2004/0267760 A1 | 12/2004 | Brundage et al. |
| 2004/0267876 A1 | 12/2004 | Kakivaya et al. |
| 2004/0268236 A1 | 12/2004 | Chidlovskii et al. |
| 2005/0004892 A1 | 1/2005 | Brundage et al. |
| 2005/0015797 A1 | 1/2005 | Noblecourt et al. |
| 2005/0021512 A1 | 1/2005 | Koenig |
| 2005/0021838 A1 | 1/2005 | Levett |
| 2005/0022115 A1 | 1/2005 | Baumgartner et al. |
| 2005/0038785 A1 | 2/2005 | Agrawal et al. |
| 2005/0039119 A1 | 2/2005 | Parks et al. |
| 2005/0050068 A1 | 3/2005 | Vaschillo et al. |
| 2005/0055358 A1 | 3/2005 | Krishnaprasad et al. |
| 2005/0055365 A1 | 3/2005 | Ramakrishnan et al. |
| 2005/0060252 A1 | 3/2005 | Doddington |
| 2005/0060647 A1 | 3/2005 | Doan et al. |
| 2005/0065949 A1 | 3/2005 | Warner et al. |
| 2005/0091093 A1 | 4/2005 | Bhaskaran et al. |
| 2005/0091424 A1 | 4/2005 | Snover et al. |
| 2005/0097084 A1* | 5/2005 | Balmin et al. ............ 707/3 |
| 2005/0102256 A1* | 5/2005 | Bordawekar et al. ............ 707/1 |
| 2005/0108203 A1 | 5/2005 | Tang et al. |
| 2005/0108630 A1 | 5/2005 | Wasson et al. |
| 2005/0129017 A1 | 6/2005 | Guingo et al. |
| 2005/0160412 A1 | 7/2005 | Thurner |
| 2005/0228792 A1* | 10/2005 | Chandrasekaran et al. ....... 707/9 |
| 2005/0257201 A1* | 11/2005 | Rose et al. ............ 717/136 |
| 2006/0031233 A1* | 2/2006 | Liu et al. ............ 707/100 |
| 2006/0064432 A1 | 3/2006 | Pettovello |
| 2006/0268934 A1 | 11/2006 | Shimizu et al. |
| 2007/0047463 A1 | 3/2007 | Jarvis et al. |
| 2007/0118547 A1 | 5/2007 | Gupta et al. |

(56) References Cited

U.S. PATENT DOCUMENTS

| | | |
|---|---|---|
| 2007/0127477 A1 | 6/2007 | Peng et al. |
| 2007/0168659 A1 | 7/2007 | Gentry et al. |
| 2008/0010302 A1 | 1/2008 | Fontoura et al. |
| 2008/0065596 A1 | 3/2008 | Shadmon et al. |
| 2008/0071733 A1 | 3/2008 | Shadmon et al. |
| 2008/0071809 A1 | 3/2008 | Lomet |
| 2010/0030727 A1 | 2/2010 | Chandrasekar et al. |

OTHER PUBLICATIONS

Comer, Douglas, "The Ubiquitous B-Tree," Computing Surveys, v. 11., n. 2, pp. 121-137, Jun. 1979.
Mullins, Judy et al., "An Integrated Data Structure with Multiple Access Paths for Database Systems," Computer Science Telecommunications, pp. 57-64, 1992.
Rys, Michael et al., "XML and Relational Database Management Systems: the Inside Story," pp. 945-947.
Fiebig, Thorsten et al., "Anatomy of a native XML base management system," The VLDV Journal (2002), 11:293-314.
Oracle, "Oracle9i Index-Organized Tables Technical Whitepaper—An Oracle White Paper", Sep. 2001, pp. 1-11.
Oracle "Technical Comparison of Oracle Database vs. IBM DB2 UDB: Focus on Performance—An Oracle White Paper," May 2005, pp. 1-23.
Wang, Fusheng et al., "Bridging Relational Database History and the Web: the XML Approach," WIDM '06, Nov. 10, 2006, Arlington, VA, pp. 3-10.
Zhang, Guogen, "Building a Scalable Native XML Database Engine on Infrastructure for a Relational Database," XIME-P 2005, Jun. 16-17, 2005, Baltimore, MD, 8 pages.
Rys, Michael, "XML and Relational Database Management Systems: Inside Microsoft® SQL Server™ 2005," SIGMOD 2005, Jun. 14-15, 2005, Baltimore, MD, pp. 958-962.
Kaushik, Raghav et al., "Covering Indexes for Branching Path Queries," ACM SIGMOD, Madison, WI, Jun. 4-6, 2002, pp. 133-144.
Cooper, Brian F. et al., "A Fast Index for Semistructured Data," Proceedings of the $27^{th}$ VLDB Conference, Roma, Italy, 2001, 10 pages.
Bruno, Nicolas et al., "Navigation- vs. Index-Based XML Multi-Query Processing," Proceedings of the $19^{th}$ International Conference on Data Engineering (ICDE'03), pp. 139-150.
Kaushik, Raghav et al., "On the Integration of Structure Indexes and Inverted Lists," SIGMOD 2004, Jun. 13-18, 2004, Paris, France, 12 pages.
Yang, Beverly et al., "Virtual Cursors for XML Joins," CIKM '04, Nov. 8-13, 2004, Washington, DC, pp. 523-532.
Seeger, Bernhard et al., "Multi-Disk B-trees," 1991 ACM, pp. 436-445.
Li, Hanyu et al., "An Evaluation of XML Indexes for Structural Join," SIGMOD Record, V. 33, n. 3, Sep. 2004, pp. 28-33.
Mehta, Dinesh et al., "Handbook of Data Structures and Applications," 1 page.
Haerder, Theo, "Implementing a Generalized Access Path Structure for a Relational Database System," ACM Transactions on Database Systems, v. 3, n. 3, Sep. 1978, pp. 285-298.
Hidders, Jan et al., "Efficient XPath Axis Evaluation for DOM Data Structures," pp. 1-10.
Grust, Torsten, "Accelerating XPath Location Steps," ACM SIGMOD 2002, Jun. 4-6, 2002, Madison, WI, pp. 109-120.
Krishnamurthy, Rajasekar et al., "XML-to-SQL Query Translation Literature: The State of the Art and Open Problems," 17 pages.
Al-Khalifa, Shurug, "Structural Joins: A Primitive for Efficient XML Query Pattern Matching," Proceedings of the $18^{th}$ International Conference on Data Engineering (ICDR '02), 2002, 12 pages.
Tatarinov, Igor et al., "Storing and Querying Ordered XML Using a Relational Database System," ACM SIGMOD 2002, Jun. 4-6, 2002, Madison, WI, pp. 204-215.
Li, Quanzhong et al., Proceedings of the $27^{th}$ VLDB Conference, Roma, Italy, 2001, pp. 361-370.
Mathis, Christian et al., "Locking-Aware Structural Join Operators for XML Query Processing," SIGMOD 2006, Jun. 27-29, 2006, Chicago, IL, pp. 467-478.
Shui, William M. et al., "Querying and Maintaining ordered XML Data Using Relational Databases," copyright 2005, pp. 85-94.
Aspnes, J. et al., "Skip Graphs," Dept. of Computer Science, Yale University, pp. 384-393.
Bonifat, A., et al., "XPath Lookup Queries in P2P Networks," WIDM '04, Nov. 12-13, 2004, Washington, DC, pp. 48-55.
Deshpande, A. et al., "Cache-and-Query for Wide Area Sensor Databases," SIGMOD 2003, Jun. 9-12, 2003, San Diego, CA, pp. 503-514.
Horowitz, E. et al., "Fundamentals of Data Structures in C++," Computer Science Press, 1995 (1 pg.).
Jagadish, H.V. et al., "BATON: A Balanced Tree Structure for Peer-to-Peer Networks," Proceedings of the 31st VLDB Conference, Trondheim, Norway, 2005, pp. 661-672.
Jagadish, H.V. et al., "VBI-Tree: A Peer-to-Peer Framework for Supporting Multi-Dimensional Indexing Schemes," Proceedings of the 22nd Int'l Conf. on Data Engineering (ICDE '06), 10 pgs.
Manku, et al., "Know they Neighbor's Neighbor: the Power of Lookahead in Randomized P2P Networks," STOC '04, Jun. 13-15, 2004, Chicago, IL, pp. 54-63.
Ooi, Beng Chin et al., "Index Nesting—an Efficient approach to indexing in object-oriented databases," The VLDB Journal, 1996, pp. 215-228.
Pugh, W., "Skip Lists: A Probabilistic Alternative to Balanced Trees," Communications of the ACM, Jun. 1990, v. 33, n. 6, pp. 668-676.
Sinha, P.K., "Distributed Operating Systems—Concepts and Design," IEEE Computer Science Press, IEEE Press, NY, Chapter 10 Naming, 1997, p. 534.
Tanenbaum, A., "Distributed File System Design," Distributed Operating Systems, Prentice-Hall Chapter 5—Distributed File Systems, Library of Congress 1995, p. 249.
Non-Final Office Action mailed Jul. 11, 2011 in related case, U.S. Appl. No. 11/624,510, filed Jan. 18, 2007 (40 pgs).
Non-Final Office Action mailed Jul. 11, 2011 in related case, U.S. Appl. No. 12/695,231, filed Jan. 28, 2010 (23 pgs).
Non-Final Office Action mailed Aug. 19, 2008 in related case, U.S. Appl. No. 11/559,887, filed Nov. 14, 2006, 16 pgs.
Final Office Action mailed May 13, 2009 in related case, U.S. Appl. No. 11/559,887, filed Nov. 14, 2006, 10 pgs.
Non-Final Office Action mailed Nov. 28, 2008 in related case, U.S. Appl. No. 11/624,510, filed Jan. 18, 2007, 24 pgs.
Final Office Action mailed Sep. 9, 2009 in related case, U.S. Appl. No. 11/624,510, filed Jan. 18, 2007, 23 pgs.
Non-Final Office Action mailed Mar. 30, 2010 in related case, U.S. Appl. No. 11/624,510, filed Jan. 18, 2007, 37 pgs.
Final Office Action mailed Dec. 8, 2010 in related case, U.S. Appl. No. 11/624,510, filed Jan. 18, 2007, 28 pgs.
Office Action mailed Feb. 28, 2012 in related case, U.S. Appl. No. 12/915,791, filed Oct. 29, 2010 (49 pgs).
Final Office Action mailed Jan. 30, 2012 in related case, U.S. Appl. No. 11/624,510, filed Jan. 18, 2007 (37 pgs).
Final Office Action mailed Jan. 30, 2012 in related case, U.S. Appl. No. 11/624,510, filed Jan. 18, 2007, (37 pgs).
Office Action mailed Jul. 24, 2013 in related U.S. Appl. No. 11/624,510, filed Jan. 18, 2007, 31 pgs.
Final Office Action mailed May 1, 2014 in U.S. Appl. No. 11/624,510, filed Jan. 18, 2007, 30 pgs.

* cited by examiner

```
<a>
    <b x="ref1">
        <c>
            <d y="some text1" z="other text1"/>
            <d z="more text1"/>
        </c>
        <c y="more text2"/>
    </b>
    <c x="ref2">
        <b z="...">
            <d y="sometext2" z="other text2"/>
            <d y="some text 3" z="othertext3"/>
        </b>
    </c>
    <b x="ref3">
        <c y="more text3"/>
        <c>
            <d z="more text4"/>
            <d y="some text4" z="other text4"/>
        </c>
    </b>
</a>
```

Figure 8

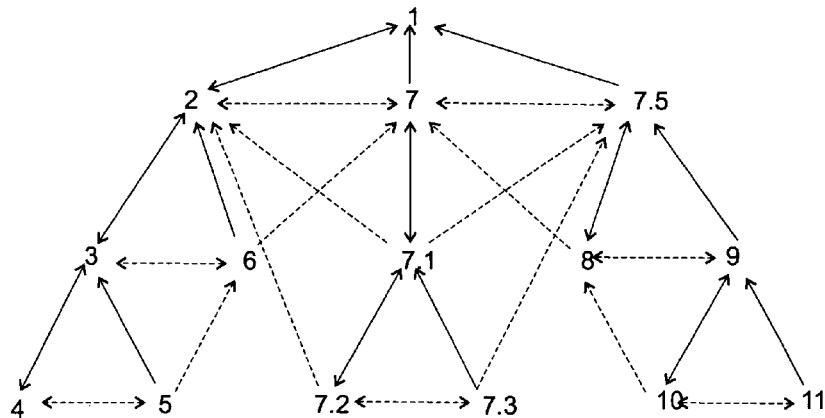

Figure 12C

```
Algorithm for dynamic prefix numbering when inserting twigs.

Precondition:
        N is reference to next node in DFS order for new twig root node T.
        N1 is the next node in DFS order following N.
        n is the number of nodes in the inserted twig
        Prefix is the document order DFS unique number for each node.

A)  delta = N1.Prefix – N.Prefix
    B)  T.Prefix=N.Prefix; //Assign the old prefix value of N to T, new twig root
    C)  N.Prefix = (delta)/2 + N.Prefix; //calculate new value of N
    D)  Interval = round(((N.Prefix – T.Prefix),precision)/n);//
    E)  Do a DFS traversal on the twig
            a.  Increment each Prefix assignment value by the Interval value starting with the twig root = T.Prefix.
            b.  Insert each new twig node into the QName thread with key of new Prefix value
            c.  Insert each new twig node into the Attribute Name thread with key of new Prefix value
```

Figure 12D

Table 1 - Structure Index Table - MTX

| Logical Key (PK) | Parent Axis | First Child Axis | Preceding Axis | Following Axis | FK Qname (FK) | FK Attrs (FK) | FK Text (FK) | Next Qname | Previous QName |
|---|---|---|---|---|---|---|---|---|---|
| 0 | -1 | 1 | -1 | -1 | 8 | 0 | -1 | -1 | -1 |
| 1 | 0 | 3 | -1 | 9 | 23 | -1 | 1 | -1 | -1 |
| 3 | 1 | 5 | -1 | 7 | 38 | 1 | 3 | -1 | -1 |
| 5 | 3 | -1 | -1 | 6 | 53 | -1 | 4 | -1 | -1 |
| 6 | 3 | -1 | 5 | 7 | 68 | -1 | 5 | -1 | -1 |
| 7 | 1 | -1 | 3 | 9 | 83 | 2 | 7 | -1 | -1 |
| 9 | 0 | 11 | 1 | 14 | 98 | 3 | 9 | 14 | -1 |
| 11 | 9 | 12 | 1 | 14 | 113 | -1 | 10 | 16 | -1 |
| 12 | 11 | -1 | 1 | 13 | 128 | -1 | 11 | 17 | -1 |
| 13 | 11 | -1 | 12 | 14 | 143 | -1 | 12 | 18 | -1 |
| 14 | 0 | 16 | 9 | 19 | 98 | 4 | 14 | -1 | 9 |
| 16 | 14 | 17 | 9 | 19 | 113 | -1 | 15 | -1 | 11 |
| 17 | 16 | -1 | 9 | 18 | 128 | -1 | 16 | -1 | 12 |
| 18 | 16 | -1 | 17 | 19 | 143 | -1 | 17 | -1 | 13 |
| 19 | 0 | 21 | 14 | -1 | 158 | 5 | 19 | -1 | -1 |
| 21 | 19 | -1 | 14 | 22 | 173 | -1 | 20 | -1 | -1 |
| 22 | 19 | 23 | 21 | -1 | 188 | -1 | 21 | -1 | -1 |
| 23 | 22 | -1 | 21 | 24 | 203 | -1 | 22 | -1 | -1 |
| 24 | 22 | -1 | 23 | -1 | 218 | -1 | 23 | -1 | -1 |

ANX = Attributes index
MTX = MTree structure index
QNX = Qname strings index (optionally can be combined into Snx)
SNX = Strings Index

Figure 13

Table 2 - QNames Table - QNX

| Logical Key (PK) | First Node Key (FK) | Length of QName | QName String (UNIQUE) |
|---|---|---|---|
| 8 | 0 | 1 | A |
| 23 | 1 | 1 | B |
| 38 | 3 | 1 | C |
| 53 | 5 | 1 | D |
| 68 | 6 | 1 | E |
| 83 | 7 | 1 | F |
| 98 | 9 | 1 | G |
| 113 | 11 | 1 | H |
| 128 | 12 | 1 | I |
| 143 | 13 | 1 | J |
| 158 | 19 | 1 | K |
| 173 | 21 | 1 | L |
| 188 | 22 | 1 | M |
| 203 | 23 | 1 | N |
| 218 | 24 | 1 | O |

Figure 14

Table 3 - String Values: SNX

| Logical Key (PK) | Parent Key (FK) | Parent Type | Length of String | String |
|---|---|---|---|---|
| 0 | 1 | Attribute | 8 | v_attr_b |
| 1 | 1 | QName | 6 | text_b |
| 2 | 3 | Attribute | 8 | v_attr_c |
| 3 | 3 | QName | 6 | text_c |
| 4 | 5 | QName | 10 | leaftext_d |
| 5 | 6 | QName | 10 | leaftext_e |
| 6 | 7 | Attribute | 8 | v_attr_f |
| 7 | 7 | QName | 6 | leaf_f |
| 8 | 9 | Attribute | 8 | v_attr_g |
| 9 | 9 | QName | 3 | t_g |
| 10 | 11 | QName | 6 | text_h |
| 11 | 12 | QName | 10 | leaftext_i |
| 12 | 13 | QName | 10 | leaftext_i |
| 13 | 14 | Attribute | 1 | g |
| 14 | 14 | QName | 1 | g |
| 15 | 16 | QName | 6 | text_h |
| 16 | 17 | QName | 8 | leaftext_i |
| 17 | 18 | QName | 8 | leaftext_j |
| 18 | 19 | Attribute | 8 | v_attr_k |
| 19 | 19 | QName | 6 | text_k |
| 20 | 21 | QName | 10 | leaftext_l |
| 21 | 22 | QName | 6 | text_m |
| 22 | 23 | QName | 10 | leaftext_n |
| 23 | 24 | QName | 10 | leaftext_o |

Figure 15

Table 4 Attribute Names Table/File ANX:

| Logical Key (PK) | Parent Key (FK) | Next Attr Node (FK) | Previous Attr Node (FK) | Length of Attribute Name | Attribute Name | Attribute Value (FK) |
|---|---|---|---|---|---|---|
| 0 | 1 | -1 | -1 | 6 | attr_b | 0 |
| 1 | 3 | -1 | -1 | 6 | attr_c | 2 |
| 2 | 7 | -1 | -1 | 6 | attr_f | 6 |
| 3 | 9 | -1 | -1 | 6 | attr_g | 8 |
| 4 | 14 | -1 | -1 | 1 | g | 13 |
| 5 | 19 | -1 | -1 | 6 | attr_k | 18 |

Figure 16

Table 5 Structure Index MTX

| Logical Key (PK) | Parent Axis | First Child Axis | Preceding Axis | Following Axis | FK Qname (FK) | FK Attrs (FK) | FK Text (FK) | Next Qname | Previous QName | Boolean Attribute |
|---|---|---|---|---|---|---|---|---|---|---|
| 0 | -1 | 1 | -1 | -1 | 8 | 2 | -1 | -1 | -1 | false |
| 1 | 0 | 3 | -1 | 9 | 23 | -1 | 1 | -1 | -1 | false |
| 2 | 1 | -1 | -1 | -1 | 233 | -1 | 0 | -1 | -1 | true |
| 3 | 1 | 5 | -1 | 7 | 38 | 4 | 3 | -1 | -1 | false |
| 4 | 3 | -1 | -1 | -1 | 253 | -1 | 2 | -1 | -1 | true |
| 5 | 3 | -1 | -1 | 6 | 53 | -1 | 4 | -1 | -1 | false |
| 6 | 3 | -1 | 5 | 7 | 68 | -1 | 5 | -1 | -1 | false |
| 7 | 1 | -1 | 3 | 9 | 83 | 8 | 7 | -1 | -1 | false |
| 8 | 7 | -1 | -1 | -1 | 273 | -1 | 6 | -1 | -1 | true |
| 9 | 0 | 11 | 1 | 14 | 98 | 10 | 9 | 14 | -1 | false |
| 10 | 9 | -1 | -1 | -1 | 293 | -1 | 8 | -1 | -1 | true |
| 11 | 9 | 12 | 1 | 14 | 113 | -1 | 10 | 16 | -1 | false |
| 12 | 11 | -1 | 1 | 13 | 128 | -1 | 11 | 17 | -1 | false |
| 13 | 11 | -1 | 12 | 14 | 143 | -1 | 12 | 18 | -1 | false |
| 14 | 0 | 16 | 9 | 19 | 98 | 15 | 14 | -1 | 9 | false |
| 15 | 14 | -1 | -1 | -1 | 308 | -1 | 13 | -1 | -1 | true |
| 16 | 14 | 17 | 9 | 19 | 113 | -1 | 15 | -1 | 11 | false |
| 17 | 16 | -1 | 9 | 18 | 128 | -1 | 16 | -1 | 12 | false |
| 18 | 16 | -1 | 17 | 19 | 143 | -1 | 17 | -1 | 13 | false |
| 19 | 0 | 21 | 14 | -1 | 158 | 20 | 19 | -1 | -1 | false |
| 20 | 19 | -1 | -1 | -1 | 328 | -1 | 18 | -1 | -1 | true |
| 21 | 19 | -1 | 14 | 22 | 173 | -1 | 20 | -1 | -1 | false |
| 22 | 19 | 23 | 21 | -1 | 188 | -1 | 21 | -1 | -1 | false |
| 23 | 22 | -1 | 21 | 24 | 203 | -1 | 22 | -1 | -1 | false |
| 24 | 22 | -1 | 23 | -1 | 218 | -1 | 23 | -1 | -1 | false |

Figure 17

Table 16 Strings SNX

| Logical Key (PK) | Parent Key (FK) | Length of String | String |
|---|---|---|---|
| 0 | 1 | 8 | v_attr_b |
| 1 | 1 | 6 | text_b |
| 2 | 3 | 8 | v_attr_c |
| 3 | 3 | 6 | text_c |
| 4 | 5 | 10 | leaftext_d |
| 5 | 6 | 10 | leaftext_e |
| 6 | 7 | 8 | v_attr_f |
| 7 | 7 | 6 | leaf_f |
| 8 | 9 | 8 | v_attr_g |
| 9 | 9 | 3 | t_g |
| 10 | 11 | 6 | text_h |
| 11 | 12 | 10 | leaftext_i |
| 12 | 13 | 10 | leaftext_i |
| 13 | 14 | 1 | g |
| 14 | 14 | 1 | g |
| 15 | 16 | 6 | text_h |
| 16 | 17 | 8 | leaftext_i |
| 17 | 18 | 8 | leaftext_j |
| 18 | 19 | 8 | v_attr_k |
| 19 | 19 | 6 | text_k |
| 20 | 21 | 10 | leaftext_l |
| 21 | 22 | 6 | text_m |
| 22 | 23 | 10 | leaftext_n |
| 23 | 24 | 10 | leaftext_o |

Figure 18

Table 7 - Names File/Table QNX

| Logical Key (PK) | First Node Key (FK) | Parent Type | Length of Name | Name (UNIQUE) |
|---|---|---|---|---|
| 8 | 0 | QName | 1 | A |
| 23 | 1 | QName | 1 | B |
| 38 | 3 | QName | 1 | C |
| 53 | 5 | QName | 1 | D |
| 68 | 6 | QName | 1 | E |
| 83 | 7 | QName | 1 | F |
| 98 | 9 | QName | 1 | G |
| 113 | 11 | QName | 1 | H |
| 128 | 12 | QName | 1 | I |
| 143 | 13 | QName | 1 | J |
| 158 | 19 | QName | 1 | K |
| 173 | 21 | QName | 1 | L |
| 188 | 22 | QName | 1 | M |
| 203 | 23 | QName | 1 | N |
| 218 | 24 | QName | 1 | O |
| 233 | 2 | Attribute | 6 | attr_b |
| 253 | 4 | Attribute | 6 | attr_c |
| 273 | 8 | Attribute | 6 | attr_f |
| 293 | 10 | Attribute | 6 | attr_g |
| 308 | 15 | Attribute | 1 | g |
| 328 | 20 | Attribute | 6 | attr_k |

Figure 19

MTREE AN XPATH MULTI-AXIS STRUCTURE THREADED INDEX

CROSS-REFERENCE TO RELATED APPLICATIONS

This application claims the benefit of U.S. Provisional Application Ser. No. 60/612,025 filed Sep. 22, 2004; U.S. Provisional Application Ser. No. 60/641,227 filed Jan. 4, 2005; U.S. Provisional Application Ser. No. 60/661,716 filed Mar. 15, 2005; and U.S. Provisional Application Ser. No. 60/698,629 filed Jul. 13, 2005; the entire disclosure of these applications is hereby incorporated by reference.

BACKGROUND OF THE INVENTION

1. Field of the Invention

The present invention relates to index data structures useful in indexing data objects such as XML documents.

2. Background Art

With the growth of the internet, internet languages based on XML have flourished. XML documents structurally can be treated as connected ordered acyclic graphs that form a spanning tree. Such documents are not multigraphs and do not have self referencing edges. The set of vertices in XML structures are called nodes. XML is used to directly represent sets of relationships that match these criteria. Typically, such sets are hierarchical tree structures.

XPath is a cyclic graph navigational query language that allows for single or branching path structure access with predicate content filtering used on an XML tree directed by a set of 13 axes navigational primitives. XPath partitions an XML document into four primary axes and a context node, such that the axes are interpreted relative to each context node. The four primary XPath axes are: preceding, following, ancestor and descendent. The remaining secondary axes can be algebraically derived from these four primary axes. Relative to the context node, 'h', the primary axes sets are graphically depicted in FIG. 1. In FIG. 1, the primary axes are encapsulated in dotted lines and span the entire graph.

XPath queries are processed from left to right location step by location steps with "/" or "//" as separators. Upon execution, XPath queries return one or more sets of nodes, called a sequence, for each location step using as input the set of nodes returned in the previous location step query in document order with duplicates eliminated. Location steps are composed of an axis, a node test and zero or more predicates: axis::node-test [predicate]*. Node tests match the vertex label, called a qualified name (or qname) in XML. For example, an XPath query may appear as such: //descendent-or-self::g[h/j]

Recently, there has been a large focus in the literature around the many problems and potential solutions for implementing XML within RDBMS systems. Many solutions have been proposed that transform the XML space to the Relational space, yet several open query problems remain with the mapping including the XML-to-SQL translation problem and query containment optimization. Alternative solutions are being sought that can avoid expensive SQL join operations, including efforts by commercial database vendor research departments. There has been much work around optimizing ancestor-descendent and parent-child linkages, but less focus has been placed on solving the antagonistic following and preceding XPath axes.

The primary prior art indexing method for relational technology is a B-Tree, designed to be optimal for height balance and $O(\lg(n))$ singleton row level access. Hierarchical XML data structures and in general generic hierarchical mapping to relational is done using various techniques with recursive edge mapping providing the most universal solution, but also the lowest level of performance. Edge mapping requires chopping up the XML tree into small discrete pieces where the edges are indexed by a B-Tree index. The reason performance is so poor for XPath is that for each query each of the discrete pieces needs to be identified and retrieved and then reassembled into the proper subtrees to satisfy the query, a lengthy process.

SUMMARY OF THE INVENTION

The present invention solves one or more problems of the prior art by providing in at least one embodiment an index ("MTree") for structured data structures. MTree includes a plurality of index keys for uniquely identifying potential context nodes in a data object. Each index key is associated with a potential context node. The MTree structure also includes a set of index attributes associated with each index key. Each set of attributes includes a first reference for locating a node in the ancestor axis, a second reference for locating a preceding subtree root node, a third reference for locating a following subtree root node, and a fourth reference for locating a node in the descendent axis. In order to be useful, the MTree data structure is stored on a digital storage medium. MTree is able to resolve all primary XPath axes location step queries in a consistent way from each context node. In some variations, MTree is an XML index data structure that directly maps to the needs of the XPath language in contrast to other implementations that convert the XML data and convert the XPath query to relational technology. The primary feature of MTree is the next subtree root node in document order for all axes are available to each context node in O(1). A performance study shows MTree able to yield orders of magnitude improvement over other methods.

BRIEF DESCRIPTION OF THE DRAWINGS

FIG. 8 is an illustrative document having repeating qnames and attribute names that can benefit from threading;

FIG. 12A-C are a graphical representations of tree insertion;

FIG. 12D is part of an algorithm for tree insertion;

FIG. 13 provides an example of the structure index table;

FIG. 14 provides an example of the QNames Table;

FIG. 15 provides an example of the String Values Table

FIG. 16 provides an example of the Attribute Names Table;

FIG. 17 provides an example of the structure index table;

FIG. 18 provides an example of the String Values Table;

FIG. 19 provides an example of the Names Table;

DETAILED DESCRIPTION OF THE PREFERRED EMBODIMENT(S)

Figure 1:
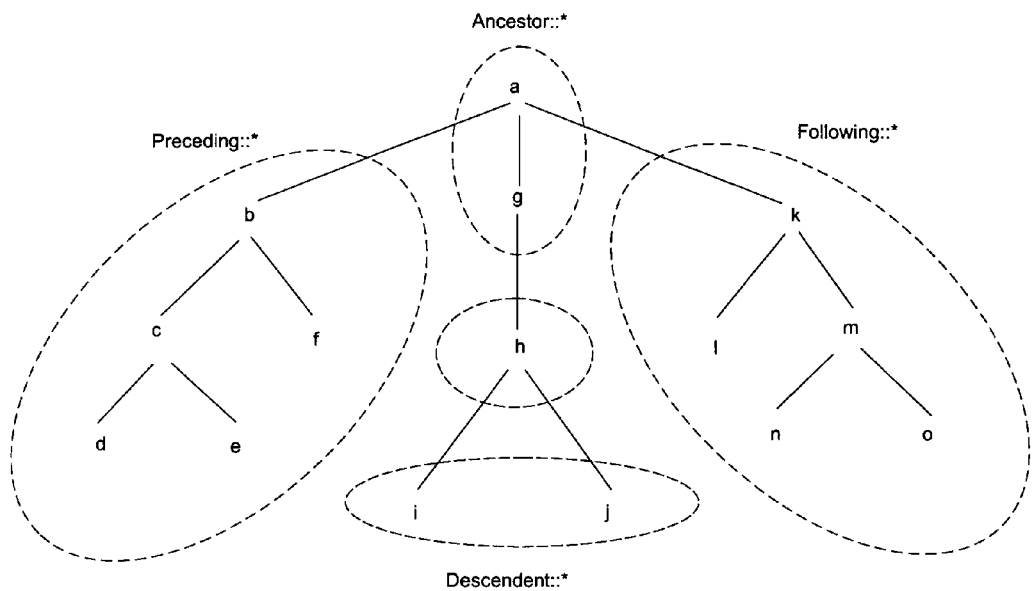
FIG. 1 is a graphical illustration of XPath logical axis sets on an XML tree relative to context node h.

Reference will now be made in detail to the presently preferred compositions or embodiments and methods of the invention, which constitute the best modes of practicing the invention presently known to the inventors.

The term "tree" or "tree structure" means a type of data structure in which each element node is attached to one or more element nodes directly beneath it. The connections between element nodes are often called branches.

The term "tree traversal" means a technique for processing the nodes of a tree in some order. Systematically following the edges of the graph so as to visit the vertices of the graph.

The term "distributed service" means a software-callable component on a remote computer.

The term "hierarchical file system" refers a file system in which directories, files and other objects are organized in a tree structure.

The term "node" refers to a unit of reference in a data structure. Examples include a vertex in graphs and trees. A node may be weighted or unweighted. If a data structure is a collection of computer systems then a node is a computer system.

The term "edge" refers to a connection between two vertices of a graph. As for a node, an edge may be weighted or unweighted.

The term "token" means a piece of an input data object that is processible by the methods of the invention.

The term "persistence" means the capability used by a computer programmer to store data structures in non-volatile storage such as a file system or a relational database.

The term "Qname" refers to XML qualified names. The •value space• of QName is the set of tuples {namespace name, local part}, where namespace name is an anyURI and local part is an NCName. The •lexical space• of QName is the set of strings that •match• the QName production of [Namespaces in XML].

The term "element node" is the name of a node in a document. Qname is an example of an element node. The term node, unless specified differently will mean element node.

The term "node attributes" means a set of attributes associated with each element node.

The term "index attributes" refers to the attributes that are associated with a representation of an element node in the MTree index.data structure.

The term "axis" as used herein refers a list of nodes in relation to the context node. Example include the ancestor axis, the child axis, the descendent axis, and the like. Collectively an axis is represented by one or more subtrees of a data object.

The term "child axis" refers to an axis that contains the children of the context node.

The term "descendant axis" refers to the axis that contains the descendants of the context node. Accordingly, a descendant is a child or a child of a child and so on. A descendant axis never contains attribute or namespace nodes The term "parent axis" refers to the axis that contains the parent of the context node if it exists.

The term "ancestor axis" refers to the axis that contains the ancestors of the context node; the ancestors of the context node consist of the parent of context node and the parent's parent and so on; thus, the ancestor axis will always include the root node, unless the context node is the root node The term "following axis" refers to an axis that contains all nodes in the same document as the context node that are after the context node in document order. The following axis does not include any descendants, attribute nodes, or namespace nodes The term "preceding axis" refers to the axis that contains all nodes in the same document as the context node that are before the context node in document order, excluding any ancestors and excluding attribute nodes and namespace nodes.

The term "root node" refers to the distinguished initial or fundamental node of a tree or subtree. The root node is characterized in having no parent.

The term "subtree root node" refers to the distinguished initial or fundamental node of a subtree.

The term "axis" as used herein refers a list of nodes in relation to the context node. Example include the ancestor axis, the child axis, the descendent axis, and the like. Collectively an axis is represented by one or more subtrees of a data object.

The term "preceding subtree root node" refers to a subtree root node of a preceding axis to a context node.

The term "following subtree root node" refers to a subtree root node of a following axis to a context node.

The term "parent subtree root node" refers to a subtree root node of a parent axis to a context node.

The term "descendant subtree root node" refers to a subtree root node of a descendent axis to a context node.

The term "pointer" refers to any variable that contains an address in memory.

The term "reference" refers to a piece of data that allows retrieval of another piece of data. Examples of references that are useful in the Mtree structure include, but are not limited to, pointers, handles, primary keys, virtual addresses, addresses, IP addresses, network addresses, MAC addresses, memory addresses, globally unique identifiers, identifiers, extensible resource identifiers ("XRI"), uniform resource identifiers ("URI"), uniform resource locators ("URL"), international resource identifier ("IRI"), and the like. Reference is the generalization of pointer as defined above.

The term "null reference" refers to a reference which does not refer to meaningful data.

The term "document order" means that all nodes in the document corresponding to the order in which the first character of the XML representation of each node occurs in the XML representation of the document.

In one embodiment of the present invention, an index data structure useful in querying structured data is provided. The index data structure index is referred herein as "MTree". MTree includes a plurality of index keys for uniquely identifying potential context nodes in a data object. Examples of data objects that may be indexed with the MTree index structure include, but are not limited to, the data object is an object selected from the group consisting of an XML document, a collection of XML documents, a collection of distributed computers, a distributed service, a collection of distributed services, hierarchical file systems, tree data structures, XML file system, relational database tables, mutlidimensional tables, computer graphics geometry space, polygon space, and combinations thereof. Each index key is associated with a potential context node. The MTree structure also includes a set of index attributes associated with each index key. Each set of attributes includes a first reference for locating a node in the ancestor axis, a second reference for locating a preceding subtree root node, a third reference for locating a following subtree root node, and a fourth reference for locating a node in the descendent axis. In a variation of the present embodiment, one or more of the following conditions are present: he first reference for locating a node in the ancestor axis is a reference to the parent node of the context node, the second reference for locating a preceding subtree root node is a reference to a closest preceding subtree root node, the third reference for locating a following subtree root node is a reference to a closest following subtree root node, and the fourth reference for locating a node in the descendant axis is a reference to a child node of the context node. In another variation of the present embodiment, the fourth reference is to a descendent subtree root node selected from the group consisting of a first descendant child node and a last descendant child node. In order to be useful, the MTree data structure is stored on a digital storage medium. Useful storage media may be volatile or non-volatile. Examples include RAM, hard drives, magnetic tape drives, CD-ROM, DVD, optical drives, and the like.

The MTree index structure may be represented as a composite overlay of several graphs which augments a tree data structure (e.g. an XML document) by introducing edges in the acyclic tree structure thereby inducing cycles corresponding to the ancestor, descendent, following and preceding primary axis. It should be appreciated that the XPath language specification mandates this axis structure. When XPath is to operate on the MTree structure, the remaining XPath axis can be derived algebraically from the primary axis graphs. The axis graphs contain nodes that are roots of subtrees of vertices that belong to the respective axis set. Axis paths are threaded reference chains of subtree root nodes connected in document order. When an axis path is traversed from a context node to the end of the path all of the nodes under the subtree root nodes along the path belong to the requested axis set for that context node.

In the present embodiment, XPath queries are implemented by performing tree traversals on the MTree Index. Although MTree reduces flexibility of a normalized relational implementation, increased query processing speed is achieve since MTree is tailored to hierarchical query languages such as XPath. MTree achieves improved performance by providing a hierarchical index that matches the navigational query access requirements of a hierarchical query language.

Figure 2:
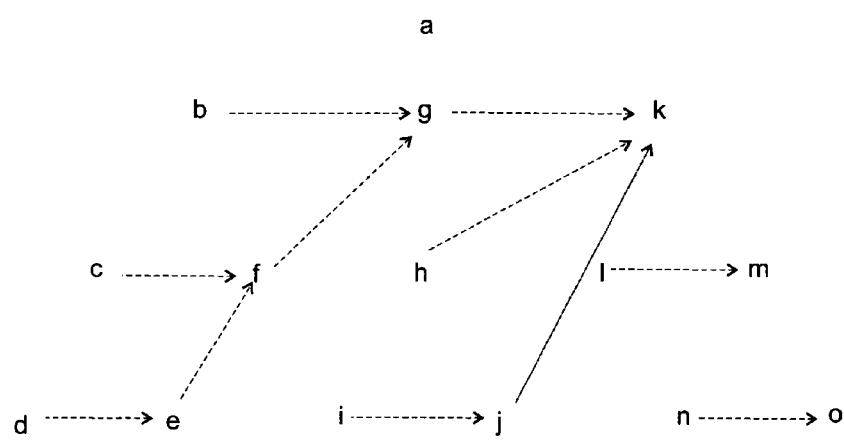
FIG. 2 is graphical illustration of the f-graph for FIG. 1.

With reference to FIG. 2, an f-graph corresponding to FIG. 1 is provided. As used herein, "f-graph" means the set of following axis pointers for some context node c. Specifically, an f-graph is the f-subtree root spanning forest on the directed graph D. A vertex v is an f-subtree root vertex such that v and all the descendents of v are contained within the following axis set of some context node c. For example, k is an f-subtree root vertex for context node h in FIG. 1. Moreover, if c is a context node and $N^*$ is the out neighborhood of the set of f-subtree root vertices for c, a following path ("f-path") is the set of the nodes of $N^*$ connected in document order starting at the context node. The term "out-neighborhood" of vertex V is the set of directed edges that originate at V, ie, having the tail attached to V also know as the out-degree of the vertex. When a super script is used, such as in N+d, the value in d represents the distance of the neighborhood from V. The out-degree for a vertex is the number of edges having tails that originate with the vertex that are not loops. The out-degree equals the number of out-neighbors when there are no self-referencing edges and there are no multiple arcs going to and from the same vertexes. For example, the following out-neighborhood $f.N^*(\{d\})=\{e, f, g, k\}$. The following out-neighborhood $f.N+1(\{d\})=\{e\}$. The following out-neighborhood $f.N+2(\{d\})=\{f\}$. The following out-neighborhood $f.N+3(\{d\})=\{g\}$. The following out-neighborhood $f.N+4(\{d\})=\{k\}$. The following out-neighborhood $f.N+5(\{d\})=\{\}$. Therefore, the vertices in the following axis set are the set of p-subtree root vertices and their set of descendent vertices located on the $N^*$ f-path, denoted $f.N^*$, relative to the context vertex c on graph D. For example, suppose we are interested in the following axis for context node 'f'. Having possession of context node 'f', one would traverse the f-path from node 'f' to f-subtree root node 'g' and subsequently onward to f-subtree root node 'k'. By traversing the f-path the following axis query for context node 'f' returns the set of f-subtree root vertexes 'g' and 'k' in two steps.

Figure 3:
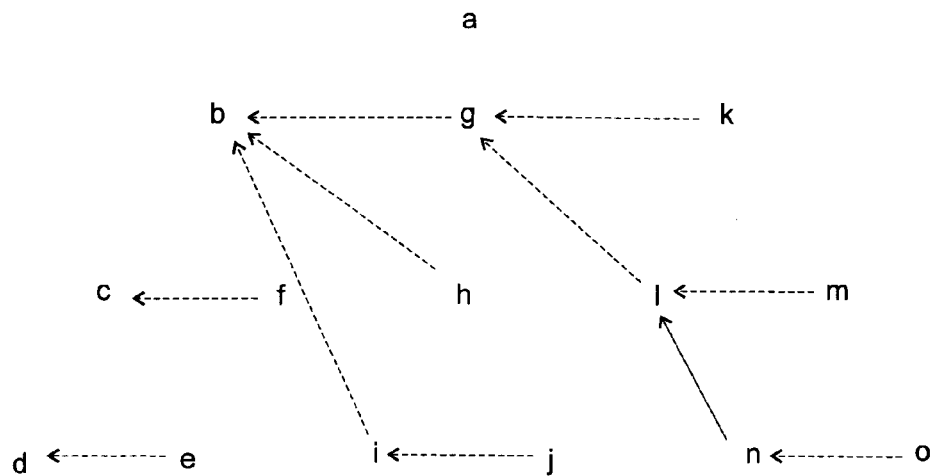
FIG. 3 is graphical illustration of the p-graph for FIG. 1.

With reference to FIG. 3, a p-graph corresponding to FIG. 1 is provided. As used herein, "p-graph" means the set of preceding axis pointers for some context node c. Specifically, a p-graph is the p-subtree root spanning forest on directed graph D. A vertex v is a p-subtree root vertex such that v and all descendents of v are contained within the preceding axis set of some context node c. For example, c is an a-subtree root vertex for context node d is FIG. 1. Moreover, if c is a context node and $N^*$ is the out neighborhood of the set of p-subtree root vertices for c, a preceding path ("p-path"), is the set of the nodes of $N^*$ connected in document order starting at the context node. For example, the preceding out-neighborhood $p.N^*(\{o\})=\{n, l, g, b\}$. The preceding out-neighborhood $p.N+1(\{o\})=\{n\}$. The preceding out-neighborhood $p.N+2(\{o\})=\{l\}$. The preceding out-neighborhood $p.N+3(\{o\})=\{g\}$. The preceding out-neighborhood $p.N+4(\{o\})=\{b\}$. The preceding out-neighborhood $p.N+5(\{o\})=\{\}$. Therefore, the vertices in the preceding axis set are the set of p-subtree root vertices and their set of descendent vertices located on the $N^*$ p-path, denoted $p.N^*$, relative to the context vertex c on graph D.

Figure 4:
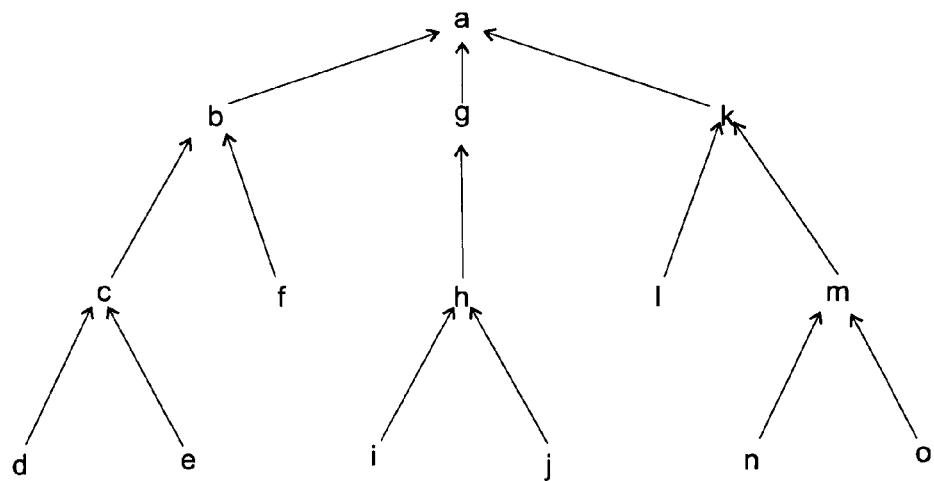
FIG. 4 is graphical illustration of the a-graph for FIG. 1.

With reference to FIG. 4, an a-graph corresponding to FIG. 1 is provided. As used herein, "a-graph" means to be the set of ancestor axis pointers for some context node c. Specifically, an ancestor-axis graph is the a-subtree root spanning forest on graph D. A vertex v is an a-subtree root vertex such that v and all ancestors of v are contained within the ancestor axis set of some context node c. If c is a context node and $N^*$ is the out neighborhood of the set of a-subtree root vertices for c, an ancestor path ("a-path") is the set of the nodes of $N^*$ connected starting at the context node and ending at the document root node. For example, the ancestor out-neighborhood $a.N^*(\{d\})=\{c, b, a\}$. The ancestor out-neighborhood $a.N+1(\{d\})=\{c\}$. The ancestor out-neighborhood $a.N+2(\{d\})=\{b\}$. The ancestor out-neighborhood $a.N+3(\{d\})=\{a\}$. The ancestor out-neighborhood $a.N+4(\{d\})=\{\}$. Therefore, the vertices in the ancestor axis set are the set of a-subtree root vertices located on the $N^*$ a-path, denoted $a.N^*$, relative to the context vertex c on graph D.

Figure 5:
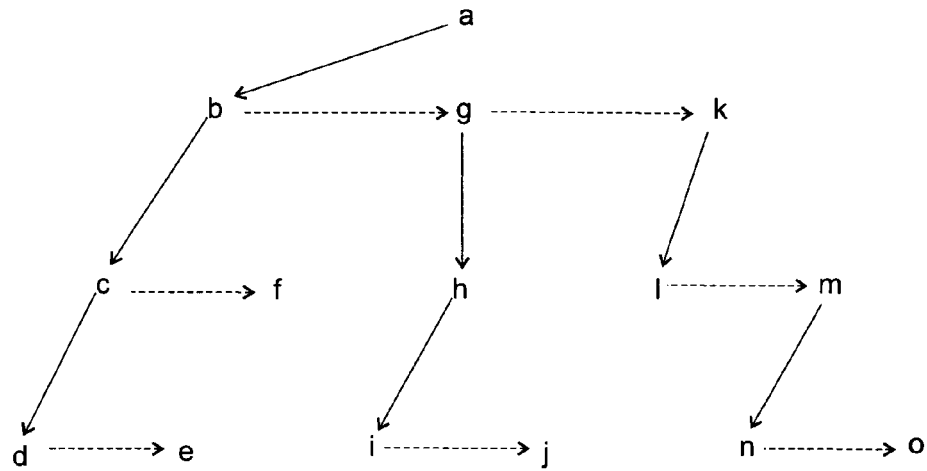
FIG. 5 is graphical illustration of the d-graph for FIG. 1.

With reference to FIG. 5, an d-graph corresponding to FIG. 1 is provided. As used herein, "d-graph" means the set of descendent axis pointers for some context node c. Specifically, a d-graph is the d-subtree root spanning forest on graph D. FIG. 5 provides the d-graph for FIG. 1. A vertex v is a d-subtree root vertex such that all descendents of v are contained within the descendent axis set of some context node c. Given FIG. 1, k is an d-subtree root vertex for context node k. If c is a context node and $N^*$ is the out neighborhood of the set of d-subtree root vertices for c, a descendent path ("d-path") is the set of the nodes of $N^*$ connected starting at the context node, descending to the first child, proceeding along the following-sibling XPath axis ending with the last child continuing downward for each first child encountered until no more children exist. For example, the descendent out-neighborhood d.N*({b})={c, f, d, e}. The descendent out-neighborhood d.N+1({b})={c, f}. The descendent out-neighborhood d.N+2({b})={d, e}. The descendent out-neighborhood d.N+3({b})={ }. Therefore, the vertices in the descendent axis set are the set of d-subtree root vertices and their set of descendent vertices located on the N* d-path, denoted d.N*, relative to the context vertex c on graph D. Dotted lines represent reuse of the XPath following-sibling axis.

Figure 6:
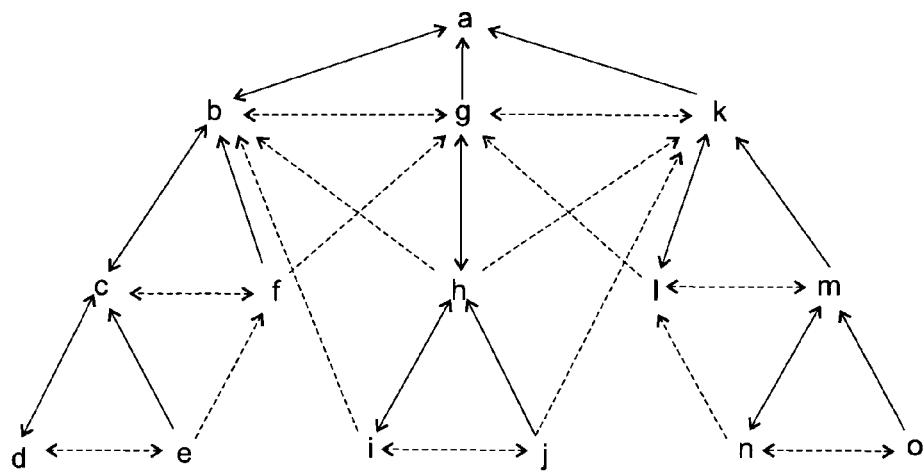
FIG. 6 is graphical representation of the MTree index corresponding to FIG. 1.
Figure 7A:
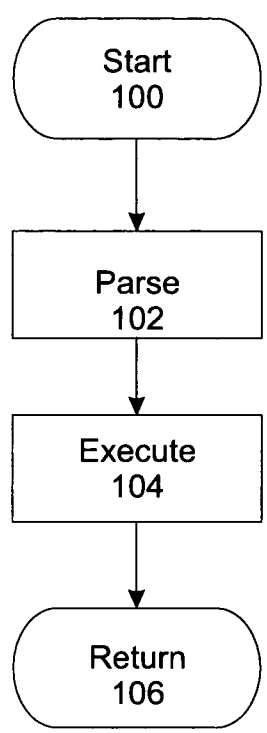
FIGS. 7A, 7B, 7C, and 7D are flowcharts illustrating the querying methods of the present invention.
Figure 7B:
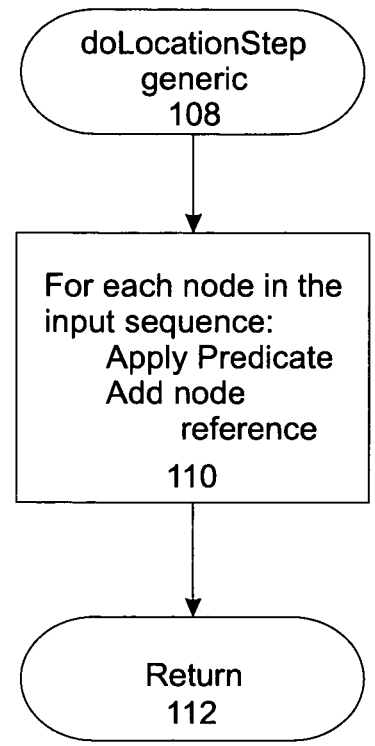
Figures 7C, 7D:
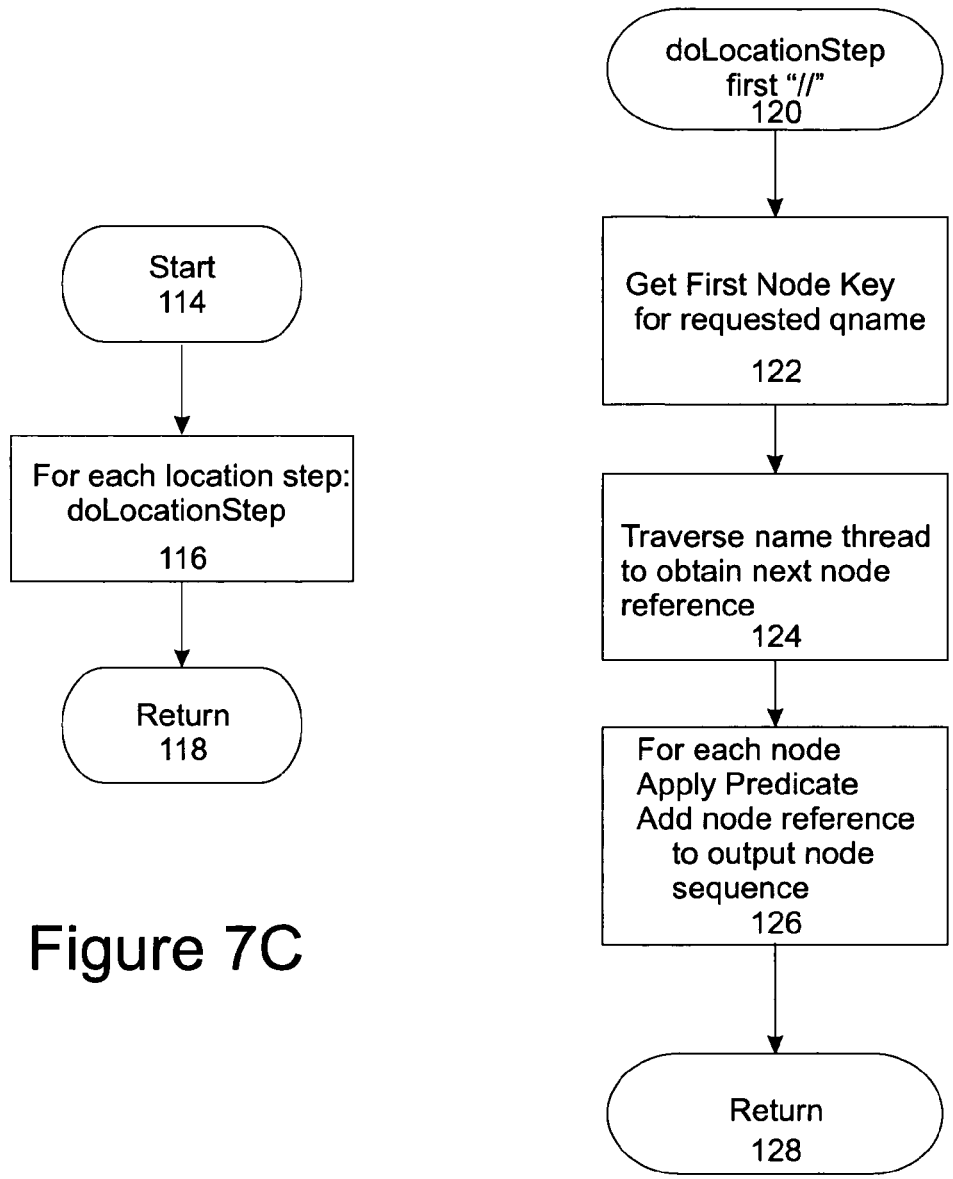

FIG. 6 provides the graphical representation of the Mtree structure index corresponding to FIG. 1. As such, this graphical representation is the composite graph overlay of f-path, p-path, a-path and d-path graphs. FIG. 6 provides the MTree index for FIG. 1. With reference to FIG. 6, solid lines represent the typical relationships managed by prior art tree structures—descendent first-child and ancestor relationships. Dashed lines represent following and preceding axis linkages. These latter two linkages are unique to MTree. For the dashed lines, the left pointing arrows are preceding axis references and the right pointing arrows are following axis references.

Since XML trees support multiple children, MTree ensures the node structure is deterministic in size by having the descendent axis retain edges to only the child for each node. Therefore, non first-child children are derived by first obtaining from the MTree the first child reference using the descendent axis and then subsequently traversing the XPath following-sibling axis until the parent axis changes.

In another embodiment of the invention, a method of querying the MTree structure is provided. The steps of the method of this embodiment are executed by a computer processor with the MTree index being present in volatile memory, non-volatile memory or a combination of both volatile and non-volitile memory. In particular, the method of the invention is executed by microprocessor bases systems. FIGS. 7A, 7B, 7C, and 7D provide flowcharts of the querying process. Queries such as XPath queries on the MTree index are managed by twig cursors that execute the location step query against the index for each node in the input sequence using well known tree traversal algorithms. The query process first involves parsing of a query (Box 102) followed by execution of the query (Box 104). Execution of the query involves execution of each location step in the query (Box 116). The predicate for each node is tested and appropriate nodes are added to the output node sequence (Box 110). Each location step query receives as input a location step and a set of nodes enqueued in document order and returns as output a results set of unique nodes in document order. The final set of nodes obtained from the last location step query is used to construct the results projection. One optimization that can be done is to use the qname thread directly (Box 120). If the query asks for "//" in the first location step the location step query can be directly answered by first looking up the qname first node reference (Box 122) and next to traverse the qname thread (Box 124). For each node we need to apply the predicate and for those that are acceptable add the node to the output sequence (Box 126).

As an illustrative example, the branching path query /a[b//c/e]/k//o using the MTree index defined in FIG. 6 is executed as follows. The query begins by evaluating the first node in the path, node 'a'. Since node 'a' exists, the predicate of node 'a' is evaluated by pushing it into the query stack and then recursively executing the location step query within the predicate. The descendent axis for node 'a' is tested for the sub-query 'b//c/e', which will result in a node set containing node 'e'. Since the predicate returns true, node 'a' is placed in the node sequence list that is passed to the next location step query. The next step query evaluates 'k', and subsequently searches the subtree under 'k' for all occurrences of 'o' returning 'o' as the final answer.

In another embodiment of the present invention, an expanded definition of the MTree data structure is provided. The MTree includes a plurality of index keys for uniquely identifying potential context nodes in a data object as set forth above. Each index key is associated with a potential context node. The MTree structure also includes a set of index attributes associated with each index key. Each set of attributes includes a first reference for locating a node in the ancestor axis, a second reference for locating a preceding subtree root node, a third reference for locating a following subtree root node, a fourth reference for locating a node in the descendent axis, and one or more additional references to data associated with one or more context nodes. Typically, the one or more additional references comprise at least one reference to a a node having data related to the context node. Such related data includes, for example, node attributes, qnames, and combinations thereof. When the related data are qnames and node attributes, the MTree index may be considered to include a representation of the a composite graph of an f-graph, p-graph, a-graph, d-graph, q-graph, and attr-graph. The definitions of f-graph, p-graph, a-graph, and d-graph are the same as above. The qname thread logically is a linked list of qnames linked in document order. The MTree approach differs from the prior art in that the nodes in qname thread linked list are threaded into the larger MTree structure index. Similarly, the attribute name thread ("attr-name thread") is a linked list that differs from the prior art because the nodes in the attr-name list are threaded into the larger MTree structure index. A q-graph is the spanning forest of all q-paths on the directed graph D. A attr-graph is the spanning forest of all attr-paths on the directed graph D. In a variation of the present embodiment, one or more of the following conditions are present: the first reference for locating a node in the ancestor axis is a reference to the parent node of the context node, the second reference for locating a preceding subtree root node is a reference to a closest preceding subtree root node, the third reference for locating a following subtree root node is a reference to a closest following subtree root node, and the fourth reference for locating a node in the descendant axis is a reference to a child node of the context node. In another variation of the present embodiment, the fourth reference is to a descendent subtree root node selected from the group consisting of a first descendant child node and a last descendant child node. In order to be useful, the MTree data structure is stored on a digital storage medium. Useful storage media may be volatile or non-volatile. Again, in order to be useful, the MTree data structure is stored on a digital storage medium. Useful storage media may be volatile or non-volatile. Examples include RAM, hard drives, magnetic tape drives, CD-ROM, DVD, optical drives, and the like. Lastly, the qname and the attr-name threads are linked into their respective chains. To improve insert performance for locating the correct nodes in the existing MTree when linking in each of the new nodes from an inserted twig, the qname and the attr-name threads can be additionally indexed by a B-Tree or other suitable high performance index structure. The best primary key data types for the nodes are ones that can be used to maintain the document ordering of nodes within the threads and that can allow for inserts without renumbering the entire index, such as the dynamic pre-order traversal sequence number.

Qualified name ("qname") and attribute name threads inclusion in Mtree are found to improve query processing by reducing the need to scan the entire tree when seeking specific qnames or specific attribute names. FIG. 8 shows a document having repeating qnames and attribute names that can benefit from threading. A used herein, QName path ("q-path") means a directed path of a sequence of vertices v1, v2, ..., vn, linked in document order having the same qname on graph D. Each q-path is rooted in an O(1) lookup structure. Similarly, as used herein, attribute name path ("attr-path") means a directed path of a sequence of vertices v1, v2, ..., vn, linked in document order having the same attribute name on graph D. Each attr-path is rooted in an O(1) lookup structure.

Figure 9:
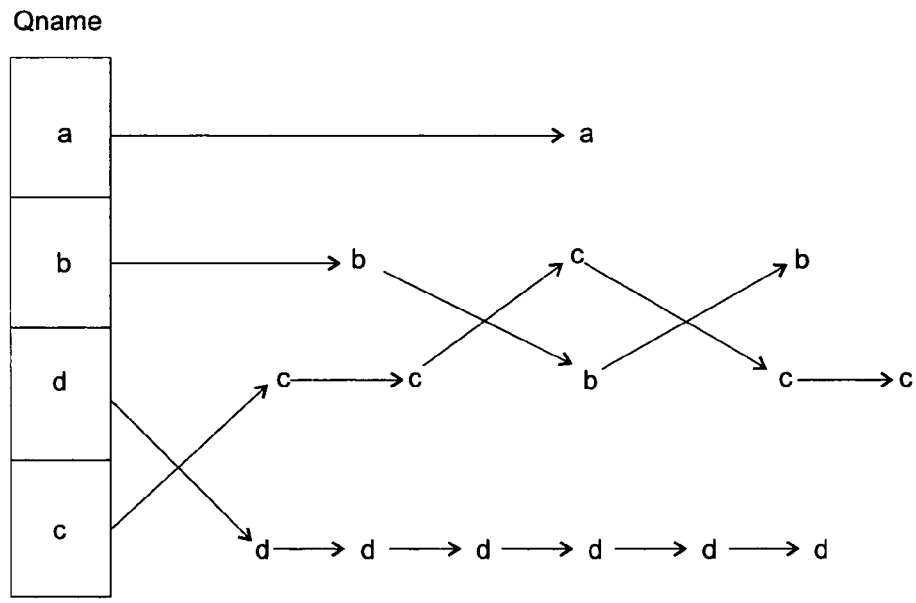
FIG. 9 is an illustration of threaded Qnames showing q-paths for document instance of FIG. 8.

With reference to FIG. 9, an illustration of threaded Qnames showing q-paths for document instance of FIG. 8 is provided. The qname thread root contains a reference to the first node in the index having that qname. Nodes having the same qnames are threaded in document order throughout the tree. Therefore, '//' queries seeking specific qnames merely need to traverse the q-path for that qname. If the '//' appears at a lower level in the query tree, one merely needs to do a range check on the q-path.

Figure 10:
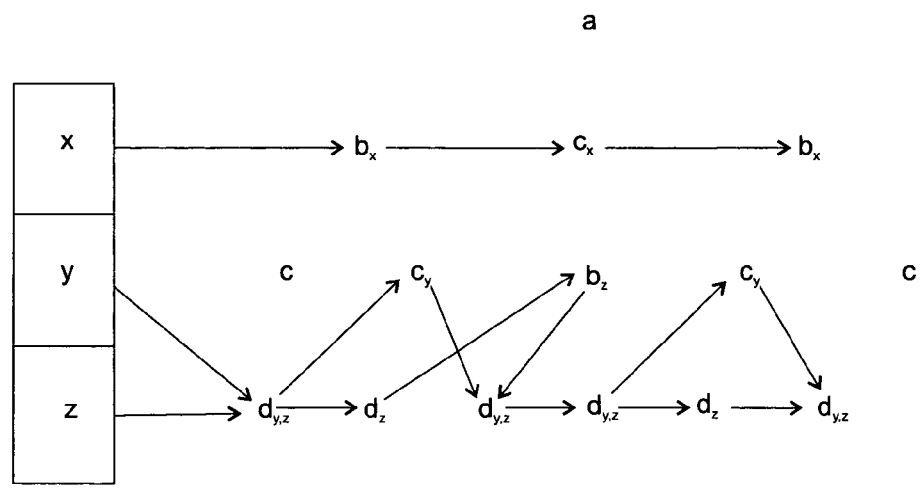
FIG. 10 is an illustration of attribute name showing attr-paths through MTree for document instance shown in FIG. 8.

With reference to FIG. 10, an illustration of attribute name showing attr-paths through MTree for document instance shown in FIG. 8 is provided. Attribute names have a one-to-many relationship with the qname they are attached to. Therefore the qname node maintains a reference to the first attribute node. Subsequent attributes for a qname are derived by traversing the overloaded f-path, following-sibling axis references, until the ancestor axis changes for the attribute nodes. FIG. 10 shows the attr-paths through the document instance defined in FIG. 8. The attribute names in this example x, y, z are represented as qname attribute in the graph.

Figure 11A:
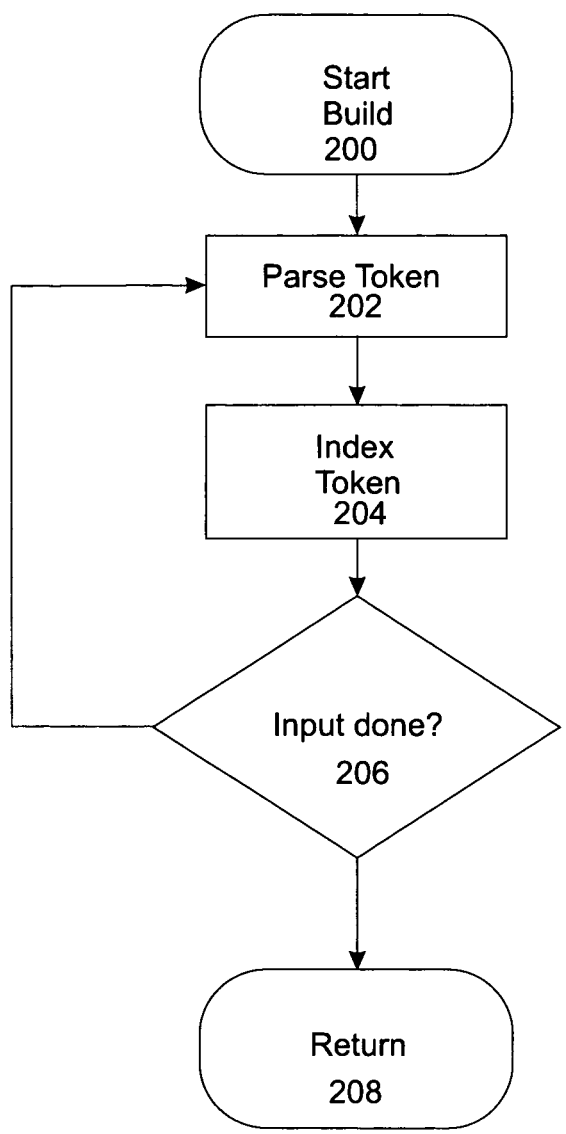
FIGS. 11A-G are flowcharts illustrating an embodiment of the creation of the MTree index data structure.
Figure 11B:
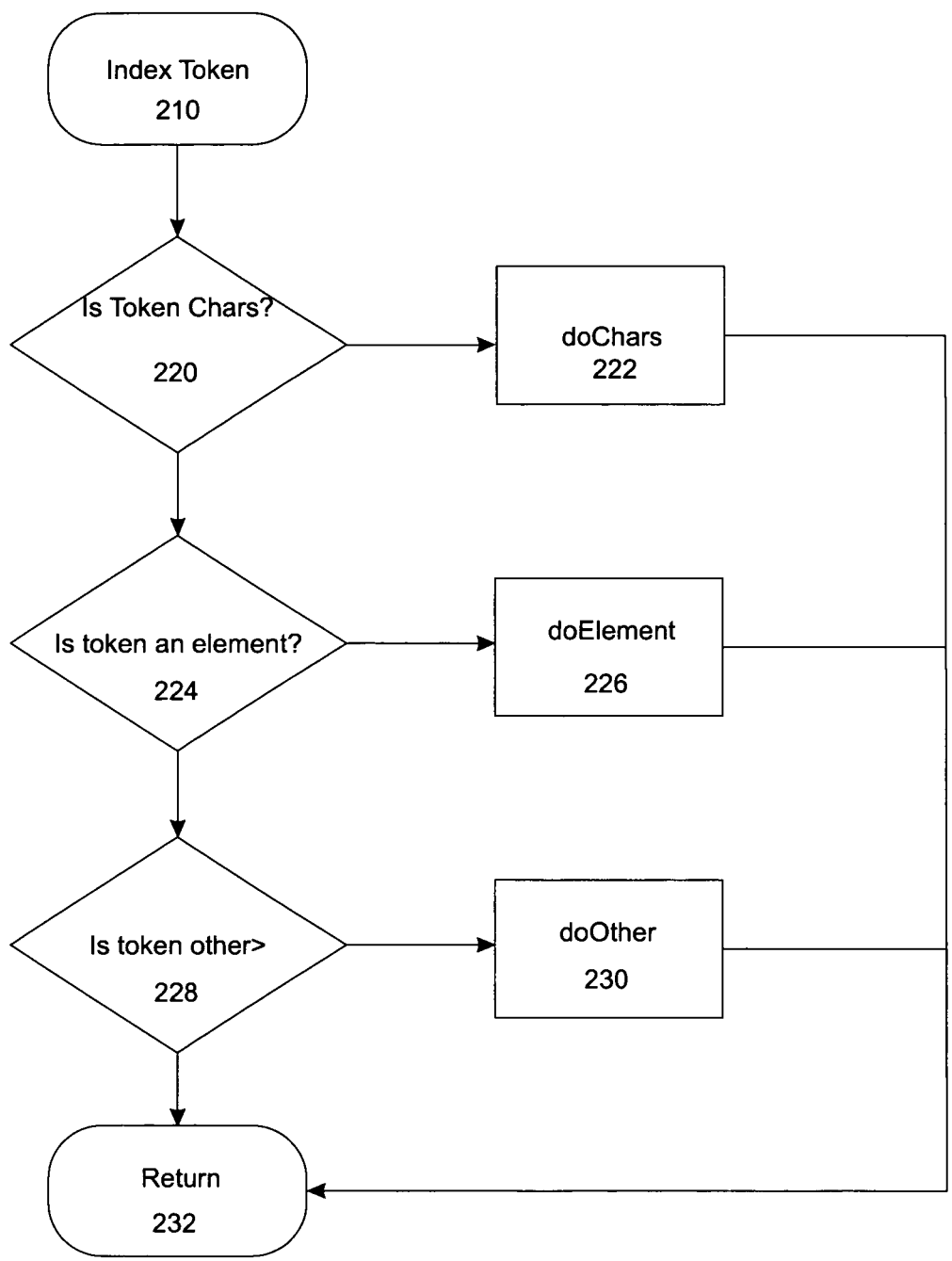
Figure 11C:
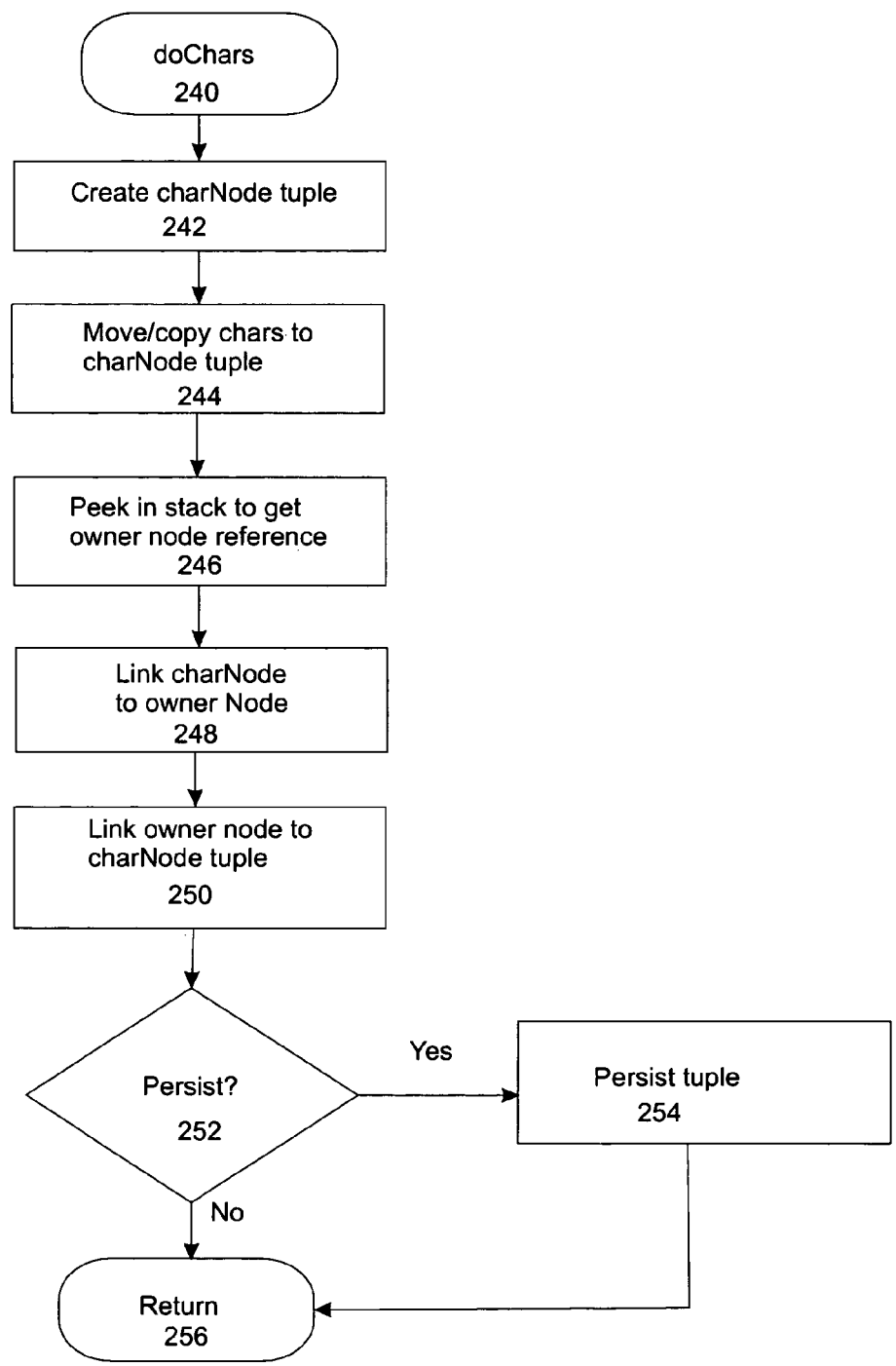
Figures 11D, 11E:
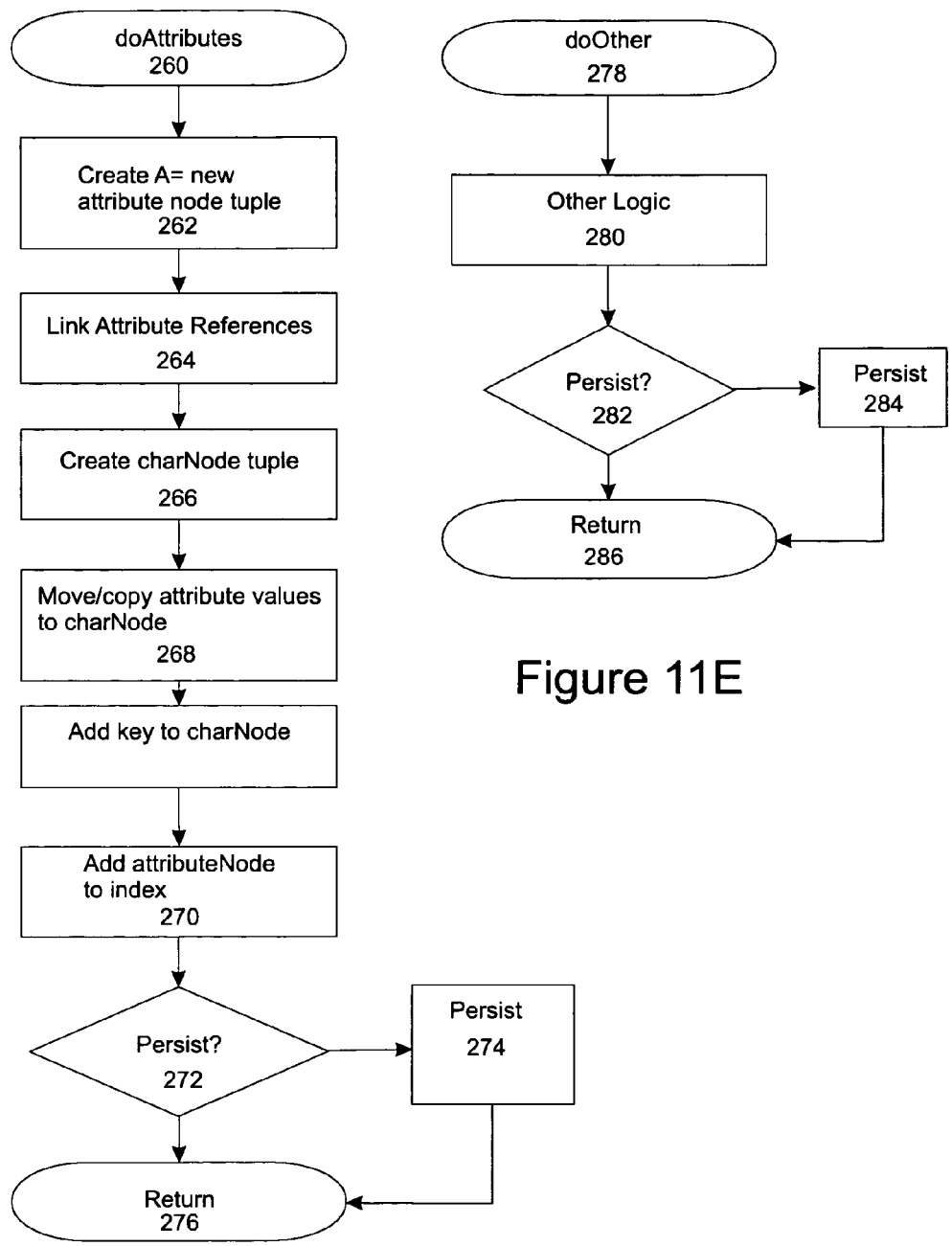
Figure 11F:
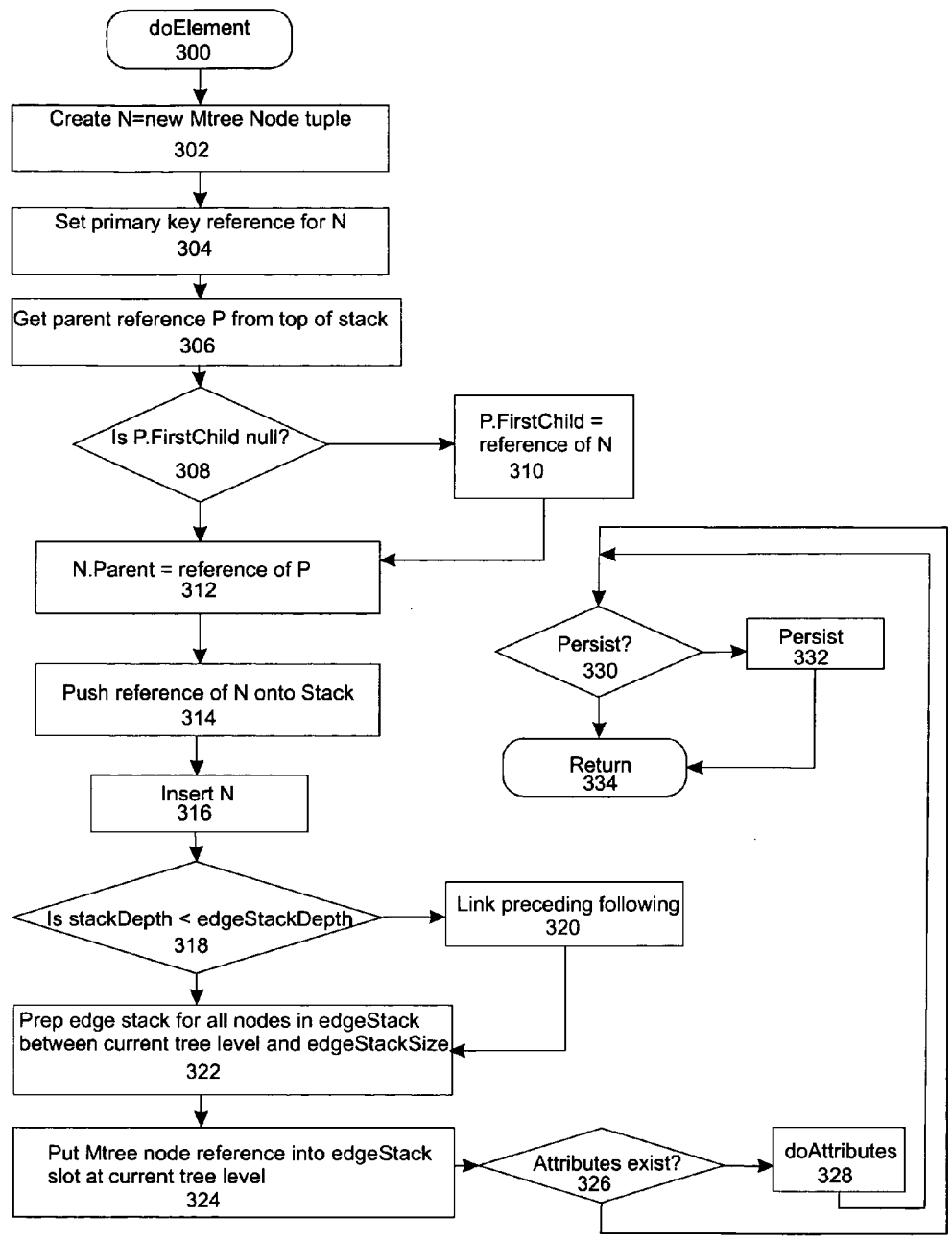
Figure 11G:
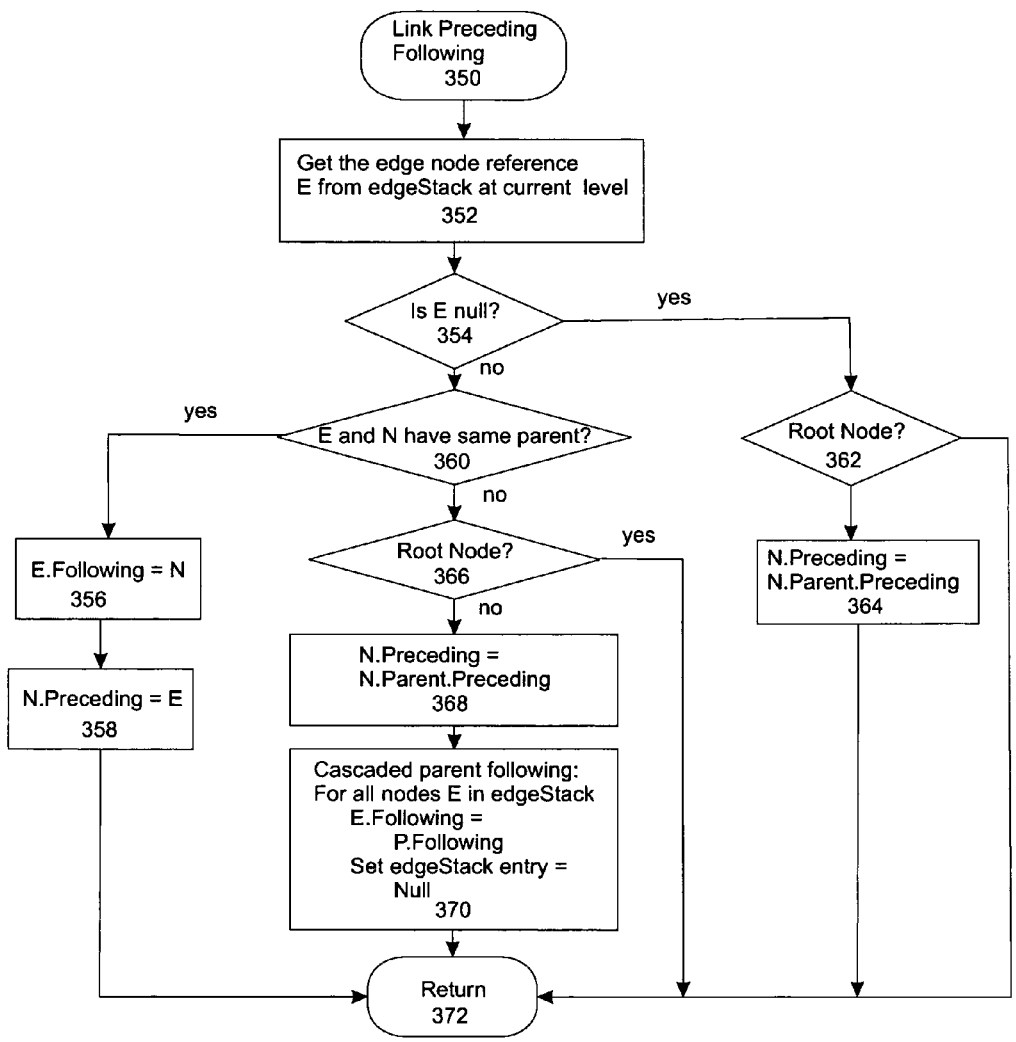

In another embodiment of the present invention, a method of creating the MTree index data structure set forth above is provided. The steps of the method of this embodiment are executed by a computer processor with the MTree index being present in volatile memory, non-volatile memory or a combination of both volatile and non-volitile memory. In particular, the method of the invention is executed by microprocessor bases systems. ith reference to FIGS. 11A-G, flowcharts illustrating the creation of the MTree index data structure are provided. The method of this embodiment comprises traversing one or more input data objects to identifying a plurality of nodes (i.e., tokens). (Box 202) Each node is indexed by associating with each identified node the following: a node representation, an associated set of index attributes, and an index key. (Box 204). Tokens are merely pieces of the input data object. The one or more data objects characteristically have a tree structure with nodes. Therefore, is such a variation the tokens are the nodes and the token representation is referred to as a node representation. As set forth above, the set of index attributes comprises a first reference for locating an ancestor subtree root node, a second reference for locating a preceding subtree root node, a third reference for locating a following subtree root node, and a fourth reference for locating a descendent subtree root node. The node representation, the associated set of index attributes, and the index key are stored on a digital storage medium. The method of FIG. 11A is optionally iteratively repeated (fro Box 206 to Box 202) until the entire document is parse.

The step of traversing the one or more data objects may be performed by virtually any method know in the art. Examples of such methods include a depth first search (left handed, right handed)*(preorder, in order, and post order) and breadth first search (left handed or right handed). In a variation of the method of this embodiment, the set of index attributes further comprises one or more additional references to data associated with one or more context nodes. The details of these additional references are described above.

Still referring to FIGS. 11A-G, The index construction process first involves reading the XML document and parsing the tokens using a tool such as SAX or DOM. Each token is process one by one in the event stream or the traversal stream. FIGS. 11A through 11G show how the MTree index is constructed using the SAX parser with DFS events. There are other methods for constructing the MTree index. Using SAX we start with a valid XML document (Box 200). Each token is parsed by SAX (Box 202) and returned to the MTree build routine for placement into the MTree index (Box 204). Parsing and indexing of tokens continues until no more remaining tokens exist (Box 206). The type of each token is interrogated (Box 220)(Box 224)(Box 228) and depending on the type the appropriate type handler is executed (Box 222)(Box 226) (Box 230). For character tokens (Box 240) the process follows. First, a new character node is created (Box 242). The character values from the input token are copied to the node (Box 244). Next, the reference to the owner is obtained by peeking into the MTree stack to obtain the reference to the top element on the MTree stack (Box 246). The owner reference is placed into the appropriate attribute in the newly created node to link the characters to the proper owner (Box 248). Next, the owner reference is dereferenced to obtain the owner node to set the owner character reference equal to the character node reference (Box 250) thus linking the character node into the MTree index via its parent. If the index is to be persisted (Box 252) then the node is converted to a tuple and persisted to the database, disk storage or other persistence method (Box 254). For attribute tokens (Box 260) the process follows. First, a new attribute node is created (Box 262). Next, the attribute node structure references are linked to the qname node it belongs to or to the preceding attribute node for the same qname (Box 264). A character node is created for the attribute node to store the characters (Box 266) and the reference of the character node is placed in the attribute node. The character values of the attribute node are copied into the newly created character node (Box 268). The attribute reference is added to the character node as a backward reference. Lastly, the attribute reference is placed into the MTree index (Box 270) thus linking the attribute node into the MTree index. If the index is to be persisted (Box 272) then the node is converted to a tuple and persisted to the database, disk storage or other persistence method (Box 274). For other token types (Box 278) the appropriate logic is executed (Box 280). If the index is to be persisted (Box 282) then the node is converted to a tuple and persisted to the database, disk storage or other persistence method (Box 284). For element tokens (Box 300) the process follows. Element tokens are essentially qname tokens. To be able to construct the MTree index in a single pass using a SAX or equivalent stream parser MTree employs an edge stack. The MTree edge stack is a novel special purpose data structure that retains the necessary knowledge of the left side of qname tokens already processed when using a depth first traversal input stream. The edge stack retains memory of the relevant subtree root nodes for linking new nodes into the index. Once an element is encountered the first step is to create a new index node, N, (Box 302). Next the primary key reference for node N is set based on the type of MTree index being created (Box 304). Next, the reference to the parent node, P, is obtained by peeking into the MTree stack to obtain the reference of the top element on the MTree stack (Box 306). A test of the parent node P is done to determine if the parent node's first child reference is null (Box 308). If the P parent node's first child reference is null then the parent node's reference is set to the newly created node N (Box 310). The node N's parent reference is set to the value of the parent node P (Box 312). The reference of N, the newly created node is pushed onto the MTree stack (Box 314). The newly created node N is inserted into the MTree index (Box 316). The MTree stack depth is compared to the depth of the MTree edge stack (Box 318) and if the MTree stack depth is less than the MTree edge stack depth then a call (Box 320) is made to link the preceding and following axis (Box 350). Next, the MTree edge stack is prepared by clearing all of the stack entries between the current tree level and the MTree edge stack size (Box 322) by setting the reference values to null. The reference of node N is placed into the MTree edge stack slot at the current level for node N (Box 324). If attributes exist (Box 326) that are attached to this qname then the attributes tokens are processed (Box 328) according to the prior explanation starting at (Box 260). If the index is to be persisted (Box 330) then the node is converted to a tuple and persisted to the database, disk storage or other persistence method (Box 332). The process to link the preceding and following axes (Box 350) is called by the process step at (Box 320) and is thus. The node reference value E is obtained from the MTree edge stack, located at the current stack level (Box 352). The reference value in E is tested to determine if it is null, null representing no reference exists (Box 354). If E is null then a test is conducted to determine if the parent of N is the root node (Box 362) and if the parent of N is the root node then the routine is exited at (Box 372). If the parent of N is not the root node then N's preceding reference is set equal to the value of N's parent's preceding reference (Box 364); the routine is exited (Box 372). Otherwise, nodes E and N are tested to determine if they have the same parent (Box 360). If both nodes, E and N, have the same parent then E's following is set to the reference value of N (Box 356) and N's preceding is set to the reference value of E (Box 358) and the routine is exited (Box 372). If both nodes, E and N, do not have the same parent then N is tested to determine if N is the root node (Box 366) and the routine is exited if true (Box 372). Otherwise, N's preceding reference is set equal to N's parent's preceding reference (Box 368) and the parent following is cascaded for all nodes, E, in the MTree edge stack such that E's following is set equal to N's parent, P's, following and the MTree edge stack entry is replaced with null; and then the routine exits (Box 372). When the SAX end element event is triggered then the MTree stack is popped, removing and discarding the topmost MTree stack element.

A variation of the method of forming the MTree index includes steps for inserting or deleting elements in the MTree data structure is provided. Insertion of elements, referred to as twigs, in accordance with the present embodiment is efficient and easy to implement. MTree supports insertion of twigs of any size, which includes single node inserts. The process for insertion can take several forms, but the one described here is in the context that the twig for insertion is itself a properly constructed MTree. Therefore, the pre-condition for an insert is the twig must be a valid MTree.

Figure 12A:
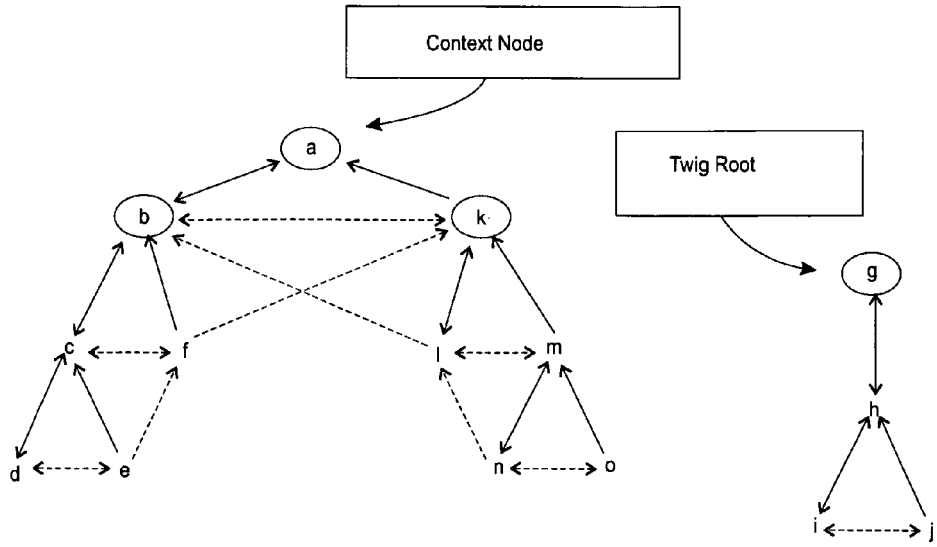
Figure 12B:
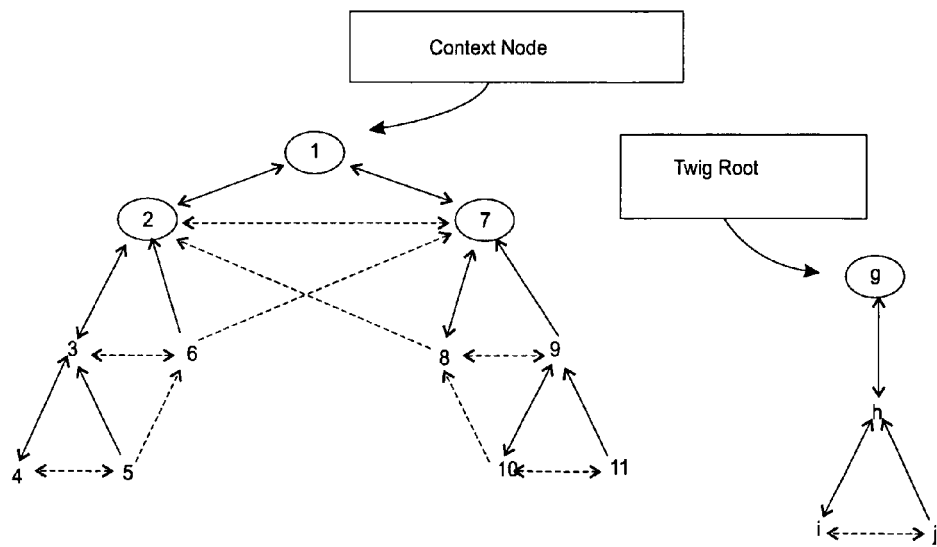

With reference to FIG. 12A to 12D, tree insertion for the MTree index data structure is illustrated. FIGS. 12A-12C provides a graphical representation of tree insertion. FIG. 12D provides part of a tree insertion algorithm. Each twig insert is an atomic operation. Twigs are inserted by attaching the twig root to a context node. Once the twig root is attached to a context node the relevant axis pointers in MTree are linked to the newly inserted twig and the relevant axis pointers in the twig are linked into the MTree. Lastly, update the qname thread and the attribute name thread. Suppose twig root 'g' is inserted at context node 'a' between siblings 'b and k' as depicted in FIGS. 12A-12D. Four specific MTree structure adjustments need to be made using the twig roots, comprised of two changes to the MTree and two changes to the newly inserted twig. The four changes can be made in any order. Once the twig is inserted we end up with the MTree shown in FIG. 6. The first adjustment is to the left subtree, descendents relative to context node 'b', such that all following axis references for the last child for the descendent axis for node 'b' need to refer to the inserted twig root 'g'. The second adjustment is to the right subtree attached to node 'k' such that all preceding axis references for the first children for the descendent axis relative to context node 'k' need to refer to the inserted twig root 'g'. Finally, change the following and preceding axis outside references of the inserted twig linking it into the tree. The left outside surface of the inserted twig is linked to 'b' the root of the left subtree and the right outside surface of the inserted twig is linked to 'k' the root of the right subtree, completing the insert operation. As exemplified by FIG. 12D, prefix node numbering is not needed for structure manipulation and insertion, but document prefix node numbering is used for the qname threads and the attributes name threads to be able to quickly insert the new nodes into the thread when the threads are implemented as leaf threaded B-Trees. The B-Tree leaf threads are the linked list shown in FIG. 9 and FIG. 10, when the qname and attr-name threads are indexed by a B-Tree. The qname and attribute name threads can be indexed using a B-Tree to maintain quick insert placement and can be processed by sequentially traversing the leaf thread in the B-Tree. When the document is loaded the node DFS prefix values are sequential integers. When new nodes need to be inserted a numbering scheme is shown in FIG. 12D. When the interval numbers become too small, essentially too fragmented, the index prefix numbering can simply be reset by doing a DFS traversal of the index and reassign the prefix numbers with the current integer counter.

MTree delete operations remove subtree sets of nodes from the index using a reversal of the insert process. Once a subtree is deleted from the MTree index the subtree node set is linked into node free list. Each deleted node is modified so that the following axis reference points to the next free node that has been deleted. An external reference is maintained to the head node in the free list. The last node in the free list points to null to indicate file or table extension is needed for more inserts. Thus deleted nodes are recycled back into the index. Fragmentation can be addressed by reorganization when necessary.

Example of the MTree Data Index Structure

With reference to FIGS. 13-19, provides examples of the MTree index structure in tabular form. With reference to FIG. 13, Table 1 showing one of many embodiments of the structure index table is provided. The columns from left to right are called Logical Key, Parent Axis, First Child Axis, Preceding Axis, Following Axis, FK QName, FK Attrs, FK Text, Next QName and Previous QName. The Logical Key column contains the unique tuple identifier. Each tuple, also known as a row, represents the structure aspects of one node in the MTree index. The Parent Axis column contains the logical key for the subtree root node of the next node used to construct the ancestor axis sequence. The First Child axis column contains the logical key for the subtree root node of the next node used to construct the descendant axis sequence. The Preceding Axis column contains the logical key for the subtree root node of the next node used to construct the preceding axis sequence. The Following Axis column contains the logical key for the subtree root node of the next node used to construct the following axis sequence. The FK QName column is the foreign key reference into the qnames table. The FK Attrs column is the foreign key reference into the Attributes table.

The FK Text column contains the foreign key reference into the string table. The Next QName column contains the primary key in the structure table of the next node in document order with the same qname. The Previous QName column contains the primary key in the structure table of the previous node in document order with the same qname.

Suppose we what to look at node G. We can see from the Table 2 that G has a logical key=98. We can see that the two G nodes from the XML sample document, FIG. 8 (see below), appear in Table 1 in rows 9 and 14, which is verified by looking at the FK Qname column and by looking at the QNames table. Suppose we look further at row 9, we can trace to the next G node by following the Next Qname reference to tuple 14. Looking at row 14 we can see the Previous QName reference is 9. Looking further at row 14 we can see that there are attributes associated with this QName so we use the foreign key of 4 to find the first attribute in the Attribute Names table, Table 4. Looking at row 14, we can see that the parent node is 0, the first child node is 16, the preceding first subtree root node is 9 and the following first subtree root node is 19. We can see FK Text is 14, so looking into the String Values table, Table 3, at primary key is 14 we see the string value associated with the node is g.

With reference to FIG. 14, Table 2 showing one of many embodiments of the QNames Table is provided. The columns from left to right are called Logical Key, First Node Key, Length of QName and QName. The Logical Key column contains the unique tuple identifier. Each tuple, also known as a row, contains the string representation of each unique qname. The column First Node Key is a foreign key reference to the first node having this unique QName located in the Structure Index Table. The Length of QName column contains the integer length of the QName string value that is stored in the QName String column. The QName String column contains the string value for each unique QName string.

Suppose we are given the query /a. We look into the Qnames table to obtain the First Node Key matching QName String='A', returning the value 0. We next look into the structure index table for tuple with a primary key=0. Since the FK Qnames=8 matches the Logical PK in the Qnames table we add this tuple reference to the output node sequence list. We look at the Next Qname value and observe that it is −1, indicating that no more tuple exist having the same QName string value. Thus our result set contains one tuple.

With reference to FIG. 15, Table 3 showing one of many embodiments of the String Values Table is provided. The columns from left to right are called Logical Key, Parent Key, Parent Type, Length of String and String. The Logical Key column contains the unique tuple identifier. Each tuple, also known as a row, contains the string representation associated with each tuple. The column Parent Key contains the logical key, primary key to the node in the Structure Index table to which the string value belongs. The column Parent Type indicates if the tuple is a value for an attribute node or a qname node. The Length of String column contains the length of the string located in the String column. The String column contains the string value associated with the node in the foreign key column named Parent Key. The String column may be separately and independently indexed using other string searching indexes such as B-Trees, bitmaps and others.

With reference to FIG. 16, Table 4 showing one of many embodiments of the Attribute Names Table is provided. The columns from left to right are called Logical Key, Parent Key, Next Attr Node, Previous Attr Node, Length of Attribute Name, Attribute Name and Attribute Value. The Logical Key column contains the unique tuple identifier. Each tuple, also known as a row, contains the attribute node information. The column Parent Key is the foreign key reference into the Structure Table for the QName node that owns this attribute. The column Next Attr Node contains the Logical Key of the next attribute that is attached to the same QName node. The column Previous Attr Node contains the Logical Key of the previous attribute node attached to that same QName node. The values for Next Attr Node and Previous Attr Node are −1 because they do not have any sibling attribute nodes. The column Length of Attribute Name contains the string length value for the string value located in the column Attribute Name. The column Attribute Name contains the name of the attribute. The column Attribute Value contains the foreign key for the tuple locate in the string table that contains the string value associated with this tuple.

With reference to FIG. 17, Table 5 showing one of many embodiments of the structure index table is provided. The columns from left to right are called Logical Key, Parent Axis, First Child Axis, Preceding Axis, Following Axis, FK QName, FK Attrs, FK Text, Next QName, Previous QName and Boolean Attr. The Logical Key column contains the unique tuple identifier. Each tuple, also known as a row, represents the structure aspects of one node in the MTree index. When the Boolean Attribute column contains a value of "false" the interpretation of the table is similar to the meaning of the structure table shown in Table X1. The Parent Axis column contains the logical key for the subtree root node of the next node used to construct the ancestor axis sequence. The First Child axis column contains the logical key for the subtree root node of the next node used to construct the descendant axis sequence. The Preceding Axis column contains the logical key for the subtree root node of the next node used to construct the preceding axis sequence. The Following Axis column contains the logical key for the subtree root node of the next node used to construct the following axis sequence. The FK QName column is the foreign key reference into the qnames table. The FK Attrs column is the foreign key reference into the Attributes table. The FK Text column contains the foreign key reference into the string table. The Next QName column contains the primary key in the structure table of the next node in document order with the same qname. The Previous QName column contains the primary key in the structure table of the previous node in document order with the same qname.

Table 5 has an additional column, Boolean Attribute. When this column contains an indicator showing "true" then this tuple represents an attribute node. Some of the column semantics are overlaid. Since following and preceding axis do not exist for attribute nodes these two columns are overlaid to reference the next and previous attribute nodes, equivalent to the columns in Table X4. The columns Next QName and Previous QName are also overlaid to reference the next and previous attribute nodes having the same name in document order.

With reference to FIG. 18, Table 6 showing an example of one of many embodiments of the String Values Table is provided. The columns from left to right are called Logical Key, Parent Key, Length of String and String. The Logical Key column contains the unique tuple identifier. Each tuple, also known as a row, contains the string representation associated with each tuple. The column Parent Key contains the logical key, primary key to the node in the Structure Index table to which the string value belongs. The Length of String column contains the length of the string located in the String column. The String column contains the string value associated with the node in the foreign key column named Parent Key. The String column may be separately and independently indexed using other string searching indexes such as B-Trees, bitmaps and others.

With reference to FIG. 19, Table 7 showing an example of of one of many embodiments of the Names Table is provided. In this version each tuple, also known as a row, contains both the QName names and the Attribute node names. The columns from left to right are called Logical Key, First Node Key, Parent Type, Length of Name and Name. The Logical Key column contains the unique tuple identifier. Each tuple, also known as a row, contains the string representation of each unique name, both qnames and attribute node names. The column First Node Key is a foreign key reference to the first node having this unique name located in the Structure Index Table. The column Parent Type indicates what node type the name belongs to. The Length of QName column contains the integer length of the QName string value that is stored in the QName String column. The QName String column contains the string value for each unique QName string.

MTree Performance Analysis

The essential MTree logical index node structure attributes are {Node Unique ID, next p-path, next f-path, next a-path, next d-path, next q-path, next attr-path, qname, text} for a read only index. If a modifiable index is needed the node is expanded to include two more attributes: prev q-path and prev attr-path. The logical axes are implemented as pointers to the next node in the axis path from the context node for the in-memory implementation and are linked using virtual address references for the disk based implementation. The disk based implementation shreds the XML document into four separate files, one file for the structure index, one file for the qname index, one file for the attribute name index and one file for string values.

TABLE 8

XMark benchmark files.

| Key | XMark xmlgen scaling factor | Nodes w/Attrs | XMark file size (KB) | MTree Index size (KB) disk implementation including full document |
|---|---|---|---|---|
| f0 | 0 | 460 | 36 | 66 |
| f1 | 0.001 | 2086 | 155 | 280 |
| f2 | 0.005 | 10492 | 740 | 1,344 |
| f3 | 0.01 | 21051 | 1,513 | 2,725 |
| f4 | 0.5 | 1024073 | 75,501 | 134,510 |
| f5 | 1 | 2048193 | 151,563 | 275,526 |
| f6 | 2 | 4103211 | 303,975 | 555,000 |

1. Implementation

The tests were conducted on a HP Pavilion ZT3000 laptop with a 1.4 MHz Intel Centrino processor having 1 GB memory running Microsoft Windows XP SP2. The MTree index and test harness software was developed using Java, J2SE JDK 1.4.2, in the Eclipse 3.0 IDE. The Xerces XML Java parser was used to read and parse the XML data stream. Timing was measured using JNI to access the Intel RDTSC register.

TABLE 9

Queries Used in Performance Analysis

| Key | XPath Query |
|---|---|
| Q1 | //open auction//description//listitem |
| Q2 | //person[profile/education] |
| Q3 | //closed auction[annotation/happiness]//seller |
| Q4 | //following::*/ . . . N . . . /following::* where N represents number of repeating "following::*" location steps. |

MTree provides methods that map directly to the event callbacks for SAX2. Using SAX, the MTree index can be constructed in a single streaming pass of the document. The XMark benchmark data was selected for testing. The sample SAX document tracer example program was modified to load the XML document and create the index using SAX events. The size of the test files are shown in Table 8.

2. Query Performance

XPath queries were tested for both implementations. The in-memory implementation was compared with SAXON, Saxon-B 8.1.1 and Xalan-Java 2.6.0. Measurements shown reflect query processing only, essentially equivalent to the "evaluate( )" method in SAXON and the "selectNodeList( )" in Xalan. Document loading cost and query parsing cost, "createExpresion( )" in SAXON, have been excluded from the measurements.

The disk based implementation for MTree takes advantage of some of the features available in the Java SDK, specifically the NIO virtual file memory map capabilities. The index files were created and subsequently persisted in a single load step using the same SAX parser implementation as the memory based implementation. The MTree index is constructed in one pass of the document during the streaming input event process created by the SAX parser.

The I/O buffer pool was "cooked" by executing a "//" query that does not use the cache so that the entire XML document is scanned seeking a node name that does not exist. The index file f5 was fully scanned in 5.0 seconds from a cold system and 0.6 seconds for the second and third scans. The buffer size was matched to the index file size, as varying the buffer size is not part of this study. Branching path queries and wild card queries were tested against the disk based implementation as well as the memory based implementation.

Figure 20:
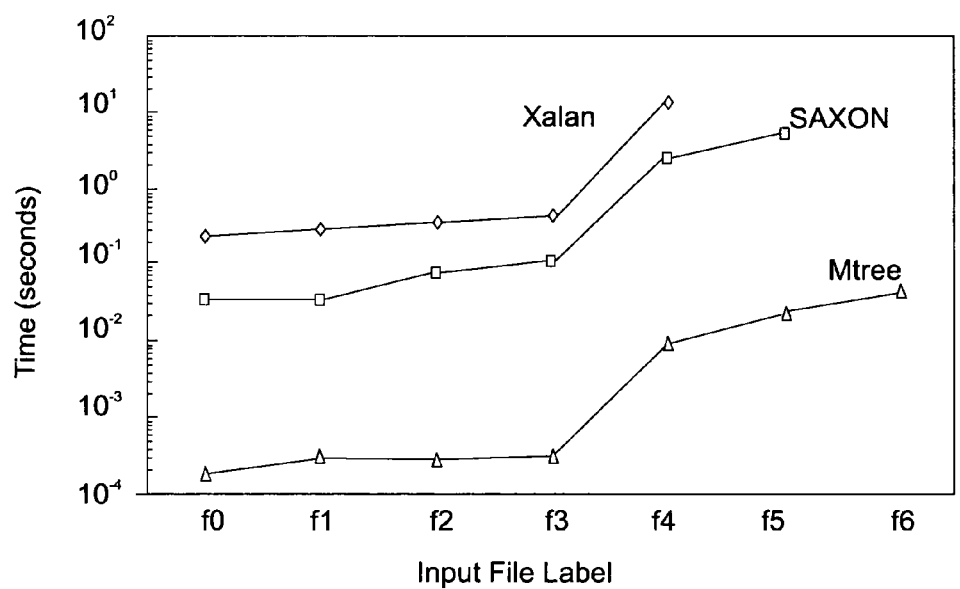
FIG. 20 is a plot of Query Q1 from Table 1.
Figure 21:
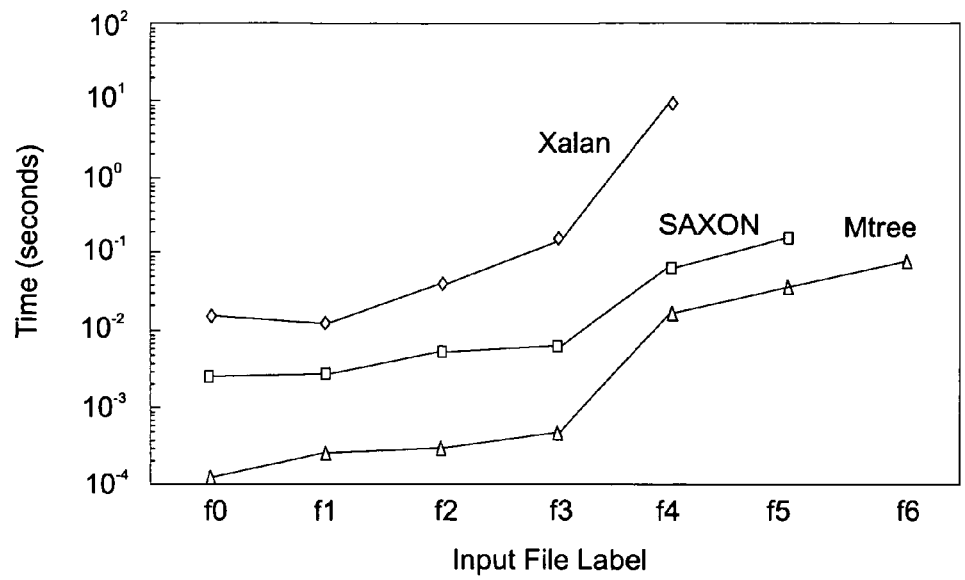
FIG. 21 is a plot of Query Q2 from Table 1.
Figure 22:
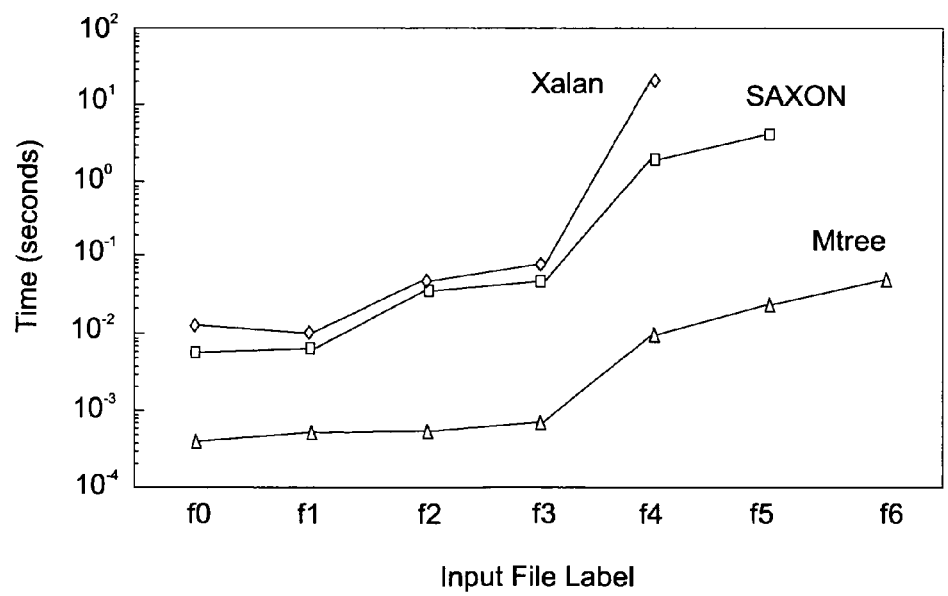
FIG. 22 is a plot of Query Q3 from Table 1.

The line plots for FIGS. 20, 21 and 22 that do not have a data point shown were not able to complete the query for that size data set. Specifically, Xalan was not able to process data file f5 or f6. SAXON was not able to process data file f6. Both products failed due to memory heap space exceeded. The Java heap space was set at 800 MB for the two largest files.

3. Recursive Queries

Recursion has been challenging for many implementations of XPath. There have been many naïve implementations showing exponential behavior, especially with some well known commercial implementations. Unlike the challenges faced by other implementations, because MTree is implemented as a tree, tree traversal algorithms are usable including the use of recursion to respond to antagonist axis queries.

Figure 23:
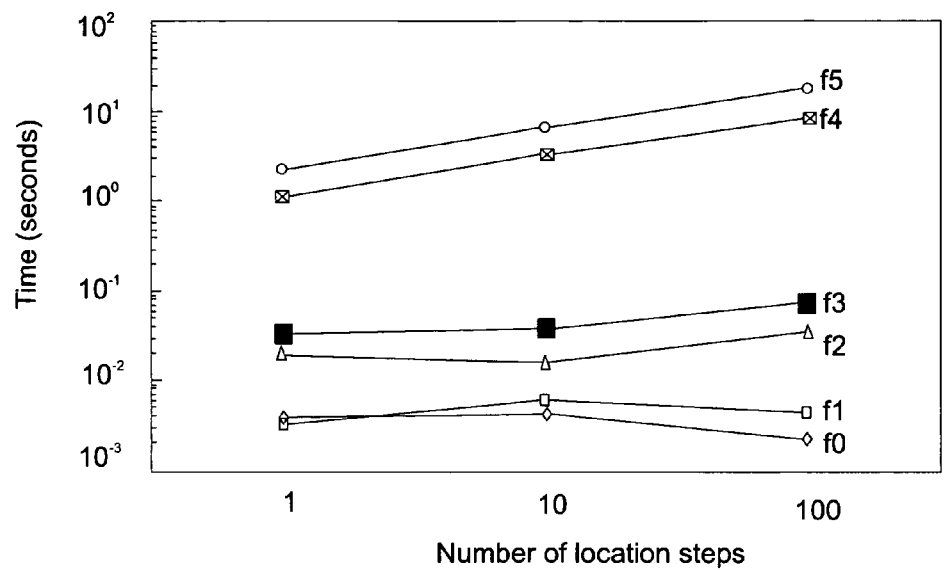
FIG. 23 is a plot of Query Q4 from Table 1.

With reference to FIG. 23, a plot of Query Q4 using MTree with a Location Step Recursion: //following::*/ . . . N . . . /following::*. Sideways recursion occurs when consecutive location step queries ask for the following or preceding axis. Suppose we are working with the query: //following::*/ . . . N . . . /following::* where N represents number of repeating "following::*" location steps. This sort of query will break most, if not all, other implementations including Xalan and SAXON. MTree resolves sideways recursion in linear time.

4. Insert Performance

Figure 24:
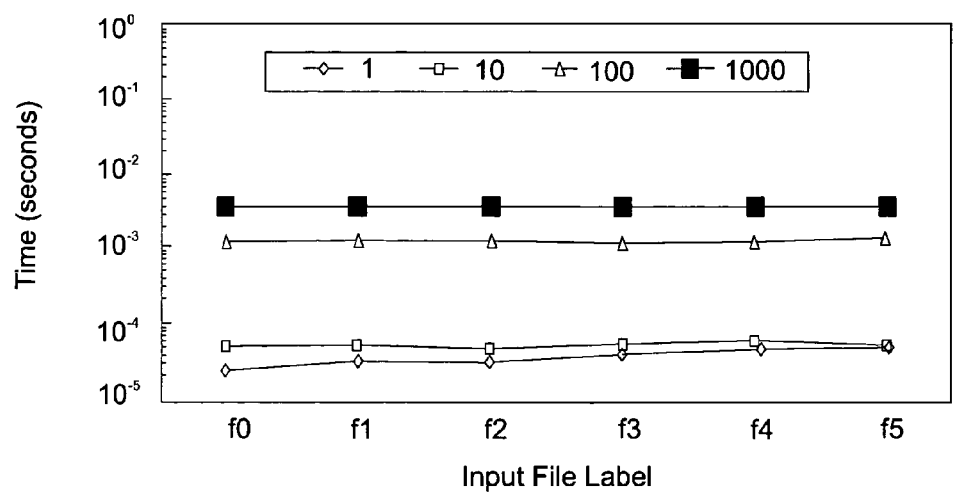
FIG. 24 are plots of the insertion performance of an embodiment of the present invention.

We inserted twigs into the closed auctions portion of the document. For each input file f0 thru f5 unique twigs having the same height were inserted one, ten, one-hundred and one-thousand times. Insert performance, FIG. 24, shows document size does not affect insert time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of creating an index data structure for one or more data objects having one or more nodes, the method comprising:

a) traversing the one or more data objects to identify a plurality of nodes;
b) associating with each node an index key and a set of index attributes, wherein each set of index attributes comprises:

a first reference for locating a node in an ancestor axis, the ancestor axis containing ancestors of a context node;

a second reference for locating a preceding subtree root node, preceding subtree root node being a subtree root node of a preceding axis to a context node, the preceding axis containing all nodes in a same document as the context node that are before the context node in document order, excluding any ancestors and excluding attribute nodes and namespace nodes;

a third reference for locating a following subtree root node, the following subtree root node being a subtree root node of a following axis to a context node, the following axis containing all nodes in the same document as the context node that are after the context node in document order excluding any descendants, attribute nodes, or namespace nodes; and a fourth reference for locating a node in a descendent axis, the descendent axis being an axis that contains the descendants of a context node; and wherein the index key uniquely identifies potential context nodes; and c) storing the index key and the associated set of index attributes on a digital storage medium.

2. The method of claim 1 wherein the step of traversing the one or more data objects comprises a depth first search or a breadth first search.

3. The method of claim 1 wherein the step of traversing the one or more data objects comprises a depth first search that is preorder, in order, or post order.

4. The method of claim 1 wherein the set of index attributes further comprises one or more additional references to data associated with one or more context nodes.

5. The method of claim 4 wherein the set of index attributes further comprises at least one reference to a node having data related to the context node.

6. The method of claim 4 wherein the data is selected from node attributes, qnames, and combinations thereof.

7. The method of claim 1 further comprising adding an index key and a set of index attributes to the index data structure associated with a new node that is added to the data object.

8. The method of claim 1 further comprising removing an index key and a set of index attributes from the index data structure associated with a node that is removed from the data object.

9. A method of querying an index data structure, the index data structure comprising:
a) a plurality of index keys for uniquely identifying potential context nodes in a data object, each index key being associated with a potential context node;
b) a set of index attributes associated with each index key, each set of attributes comprising:

a first reference for locating a node in an ancestor axis, the ancestor axis containing ancestors of a context node;

a second reference for locating a preceding subtree root node, preceding subtree root node being a subtree root node of a preceding axis to a context node, the preceding axis containing all nodes in a same document as the context node that are before the context node in document order, excluding any ancestors and excluding attribute nodes and namespace nodes;

a third reference for locating a following subtree root node, the following subtree root node being a subtree root node of a following axis to a context node, the following axis containing all nodes in the same document as the context node that are after the context node in document order excluding any descendants, attribute nodes, or namespace nodes; and a fourth reference for locating a node in a descendent axis, the descendent axis being an axis that contains the descendants of a context node; and wherein the index data structure is stored on a digital storage medium, the method comprising:

parsing a query into elementary steps;

executing the elementary steps on the index data structure; and return results of the query.

10. The method of claim 9 wherein the query comprises one more location steps.

* * * * *